US012687707B2

(12) United States Patent
Obikane

(10) Patent No.: US 12,687,707 B2
(45) Date of Patent: Jul. 21, 2026

(54) OPTICAL SYSTEM AND PHOTOGRAPHING DEVICE HAVING OPTICAL SYSTEM

(71) Applicant: BEIJING XIAOMI MOBILE SOFTWARE CO., LTD., Beijing (CN)

(72) Inventor: Yasuhiko Obikane, Tokyo (JP)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 345 days.

(21) Appl. No.: 18/289,639

(22) PCT Filed: May 5, 2022

(86) PCT No.: PCT/CN2022/091047
§ 371 (c)(1),
(2) Date: Nov. 6, 2023

(87) PCT Pub. No.: WO2023/212877
PCT Pub. Date: Nov. 9, 2023

(65) Prior Publication Data
US 2025/0076620 A1       Mar. 6, 2025

(51) Int. Cl.
*G02B 13/00*       (2006.01)
*G02B 13/02*       (2006.01)
*G02B 15/14*       (2006.01)

(52) U.S. Cl.
CPC ....... *G02B 13/009* (2013.01); *G02B 13/0065* (2013.01); *G02B 13/02* (2013.01); *G02B 15/1431* (2019.08)

(58) Field of Classification Search
None
See application file for complete search history.

(56) References Cited

U.S. PATENT DOCUMENTS

| | | | |
|---|---|---|---|
| 5,640,276 A * | 6/1997 | Ogata | G02B 15/144103 |
| | | | 359/686 |
| 9,625,689 B2 * | 4/2017 | Harada | G02B 27/646 |

(Continued)

FOREIGN PATENT DOCUMENTS

| | | |
|---|---|---|
| CN | 102236152 A | 11/2011 |
| CN | 102411189 A | 4/2012 |

(Continued)

OTHER PUBLICATIONS

PCT/CN2022/091047, International Search Report and Written Opinion dated Sep. 21, 2022, 9 pages.

(Continued)

*Primary Examiner* — Robert E. Tallman
(74) *Attorney, Agent, or Firm* — Cozen O'Connor

(57) ABSTRACT

An optical system includes: a first lens group having a positive refractive power, a second lens group having a negative refractive power and a third lens group having a positive or negative refractive power, arranged from an object side to an image side; when focusing, the second lens group moves along an optical axis, positions of the first and third lens groups relative to an imaging plane along the optical axis are fixed; when a lateral magnification of the third lens group at infinity is b3, a distance from a face closest to the object side of the entire optical system to the imaging plane is OAL, a focal length of the entire optical system focusing at infinity is f, and a maximum lateral magnification of the entire optical system is B, it is satisfied that: $(0.80 \leq b3)$, $(OAL/f \leq 2.00)$, $(0.50 \leq |B|)$.

19 Claims, 26 Drawing Sheets

(56)　　　　　　References Cited

U.S. PATENT DOCUMENTS

| | | | | |
|---|---|---|---|---|
| 2013/0300868 | A1 * | 11/2013 | Yamamoto | ..... G02B 15/145129 |
| | | | | 359/687 |
| 2022/0121004 | A1 * | 4/2022 | Noda | ................... G02B 13/006 |
| 2022/0308326 | A1 * | 9/2022 | Tomioka | ........ G02B 15/145127 |

FOREIGN PATENT DOCUMENTS

| | | | | |
|---|---|---|---|---|
| CN | 106249379 | A | | 12/2016 |
| CN | 106255912 | A | | 12/2016 |
| CN | 109073865 | A | | 12/2018 |
| CN | 114080557 | A | | 2/2022 |
| JP | 2013092575 | A | | 5/2013 |
| JP | 2014102358 | A | | 6/2014 |
| JP | 5749629 | B2 | | 7/2015 |
| JP | 2015215437 | A | * | 12/2015 |
| JP | 2016206491 | A | | 12/2016 |
| JP | 6579997 | B2 | | 9/2019 |
| JP | 2021173847 | A | | 11/2021 |

OTHER PUBLICATIONS

European Patent Application No. 22940573.3, Search and Opinion dated Jun. 24, 2025, 7 pages.
Japanese patent application No. 2022-534446, Office Action dated May 31, 2024, 6 pages.
Japanese patent application No. 2022-534446, English translation of Office Action dated May 31, 2024, 6 pages.
Chinese Patent Application No. 202280001639.4 Office Action dated Nov. 7, 2025, with English translation, 16 pages.

* cited by examiner

OPTICAL SYSTEM AND PHOTOGRAPHING DEVICE HAVING OPTICAL SYSTEM

CROSS-REFERENCE TO RELATED APPLICATIONS

The present application is a U.S. National Stage of International Application PCT/CN2022/091047, filed on May 5, 2022, the contents of all of which are incorporated herein by reference in their entireties for all purposes.

SUMMARY

The disclosure relates to an optical system having a plurality of lens groups and a photographing device having the optical system.

According to a first aspect of embodiments of the present disclosure, an optical system of the present disclosure includes: a first lens group having a positive refractive power, a second lens group having a negative refractive power and a third lens group having a positive or negative refractive power, sequentially arranged from an object side to an image side; when focusing, the second lens group moves along an optical axis, positions of the first lens group and the third lens group relative to an imaging plane in a direction of the optical axis are fixed, when a lateral magnification of the third lens group focusing at infinity is b3, a distance from a face closest to the object side of the entire optical system to the imaging plane is OAL, a focal length of the entire optical system focusing at infinity is f, and a maximum lateral magnification of the entire optical system is B, it is satisfied that: $0.80 \leq b3$, $OAL/f \leq 2.00$, and $0.50 \leq |B|$.

According to a second aspect of embodiments of the present disclosure, an optical system of the present disclosure includes: a first lens group having a positive refractive power, a second lens group having a negative refractive power and a third lens group having a positive or negative refractive power, sequentially arranged from an object side to an image side, when focusing, the second lens group moves along an optical axis, positions of the first lens group and the third lens group relative to an imaging plane in a direction of the optical axis are fixed, the second lens group has at least one lens having a positive refractive power, when a refractive index of the lens having a positive refractive power based on a d-line is nd2p, an Abbe number of the lens having a positive refractive power based on the d-line is vd2p, and a variable is A, it is satisfied that: $nd2p=-0.01 \times vd2p+A$, $1.55 \leq nd2p \leq 1.72$, and $1.82 \leq A \leq 1.94$.

According to a third aspect of the present disclosure, a photographing device of the present disclosure includes: any of the above optical systems; and a photographing element arranged at a side of the imaging plane of the optical system and configured to convert an optical image formed by the optical system into an electrical signal.

DETAILED DESCRIPTION

In related art, the optical system described in Japanese patent communiqué No. 5749629 is not sufficient for close range photographing, and the optical system described in patent Japanese special publication communiqué No. 2021-173847 is not sufficiently miniaturized because a ratio of a total length of the optical system to a total lens of a focal length is large.

Hereinafter, an embodiment of the present disclosure will be described with reference to the drawings.

Figure 1:
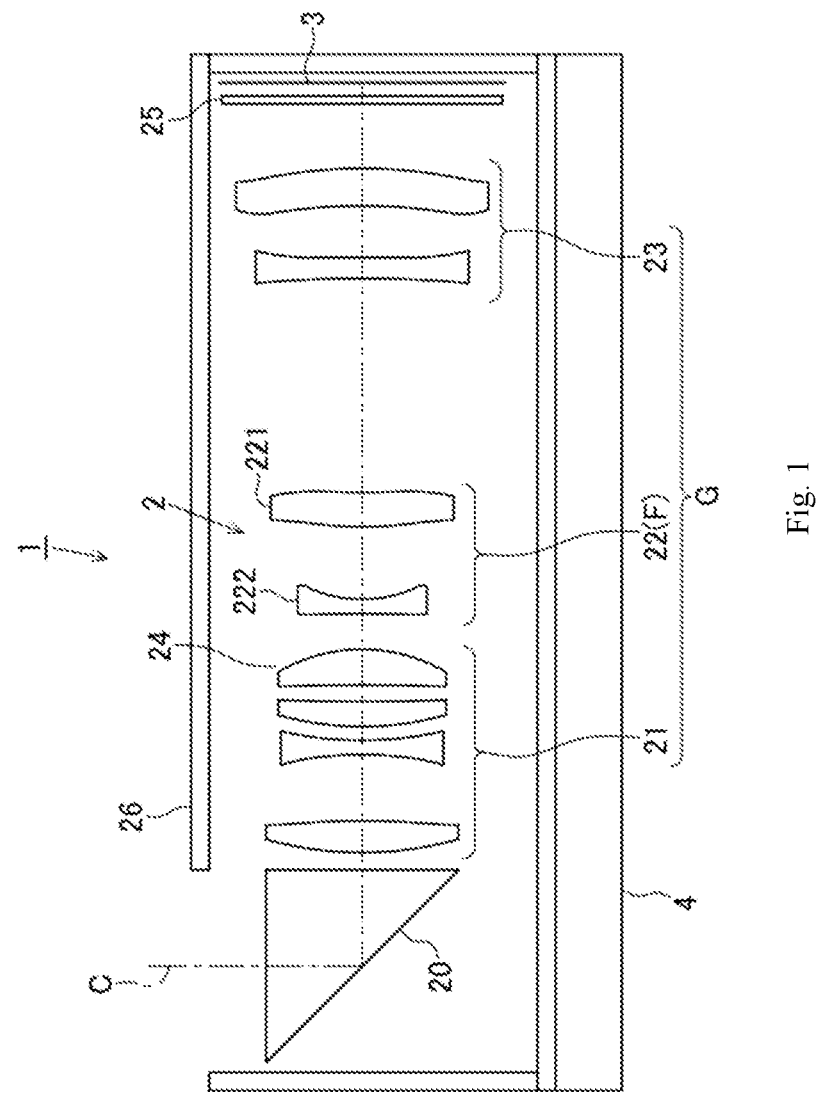
FIG. 1 is a schematic diagram showing a configuration of a photographing device according to an embodiment.

As shown in FIG. 1, a photographing device 1 according to the present embodiment includes an optical system 2, a photographing element 3 arranged at a position of an imaging plane of the optical system 2, and a liquid crystal screen 4 for displaying photographing (image) data transmitted from a photographing element 3. The photographing device 1 includes a driving part (not shown in the figures) for driving the optical system 2. The driving part is an actuator such as a VCM (Voice Coil Motor), to drive a predetermined lens or lens group and the like included in the optical system 2 in a direction substantially perpendicular to a light receiving surface of the photographing element 3 (a direction of an optical axis). In addition, the photographing element 3 is an element that converts an optical image formed by the optical system 2 into an electrical signal (photographing data), and the photographing element 3 of the present embodiment is a CMOS image sensor.

The optical system 2 is a so-called internal focus optical system, and the optical system 2 of the present embodiment is a so-called periscope telephoto lens in which an optical axis (optical path) C is bent by a reflective optical element such as a prism or a mirror. Specifically, the optical system 2 includes a prism 20 that bends the optical axis C and a plurality of lens groups G arranged on the optical axis C, sequentially from an object side to an image side along the optical axis C. In addition, the optical system 2 includes an aperture diaphragm 24, an optical filter 25 arranged between the plurality of lens groups G and the photographing element 3, and a lens barrel 26 holding the plurality of lens groups G.

The plurality of lens groups G at least include a first lens group 21, a second lens group 22, and a third lens group 23 sequentially from the object side to the image side along the optical axis C. Each of the lens groups 21, 22 and 23 includes at least one lens (optical element).

In addition, in the optical system 2 of the present embodiment, the lens groups 21 to 23 are named for convenience, and include a lens group composed of only one optical element (lens, etc.). That is, the first to third lens groups 21, 22 and 23 each have at least one optical element such as a lens. In addition, in the optical system 2, the optical elements (lenses, etc.) whose positions are fixed on the optical axis C during focusing are separated from the moving optical elements, and the at least one fixed optical element in a separated area is regarded as one lens group, and the at least one moving optical element in a separated area is regarded as another lens group.

In the above-mentioned optical system 2, during focusing, the second lens group 22 moves along the optical axis C, and positions of the first lens group 21 and the third lens group 23 in the direction of the optical axis C are fixed relative to the photographing element 3 (the imaging plane of the optical system 2). That is, in the optical system 2 of the present embodiment, among the lens groups 21, 22 and 23, the second lens group 22 constitutes a focusing lens group F.

The lens groups 21 to 23 in the optical system 2 will be described in detail below.

The first lens group 21 includes a plurality of lenses (four lenses in an example of the present embodiment) having a positive refractive power. In addition, the second lens group 22 includes a plurality of lenses (two lenses in the example of the present embodiment) having a negative refractive power. In addition, the third lens group 23 includes a plurality of lenses (two lenses in the example of the present embodiment) having a positive or negative refractive power.

When a lateral magnification of the third lens group 23 focusing at infinity is b3, a distance from a face closest to the object side of the entire optical system to the imaging plane is OAL, a focal length of the entire optical system focusing at infinity is f, and a maximum lateral magnification of the entire optical system is B, the optical system 2 satisfies the following formula (1), (2), (3).

$$0.80 \leqslant b3 \tag{1}$$

$$OAL/f \leqslant 2.00 \tag{2}$$

$$0.50 \leqslant |B| \tag{3}$$

In the above optical system 2, among the plurality of lens groups G arranged along the optical axis C, the first lens group 21 having a positive refractive power is arranged at closest to the object side, the second lens group 22 having a negative refractive power is arranged at an image side of the first lens group 21, and the third lens group 23 having a positive or negative refractive power is arranged closest to the image side. As a result, it is easy to obtain a focal power arrangement of telephoto in the optical system 2, and therefore a focal length of the first lens group 21 may be shortened, resulting in that miniaturization of the optical system 2 (specifically, miniaturation in the direction of the optical axis C) may be realized.

Moreover, by moving the second lens group during focusing, the aberration variation balance with the front and rear lens groups 21, 23 may be adjusted. Bending variation of the imaging plane during a close range photographing may be suppressed compared with a whole extension mode, so that the close range photographing distance may be further shortened.

Furthermore, by fixing the first lens group 21 and the third lens group 23 relative to the imaging plane, only the second lens group 22 is set as a movable lens group, so that a load on a mechanism or actuator may be reduced, and therefore, the overall miniaturization of the photographing device 1 including the optical system 2 may be realized.

The above formula (1) specifies the lateral magnification (b3) of the third lens group 23 focusing at infinity. When the lateral magnification (b3) is lower than a lower limit (0.80), the lateral magnification of the lens group (third lens group) 23 closest to the image side among the plurality of lens groups 21, 22 and 23 becomes smaller, so that the focal length of the second lens group 22 becomes longer, and the miniaturization of the entire optical system 2 is insufficient.

In addition, the above formula (2) represents the distance (OAL) from the face closest to the object side of the entire optical system 2 to the imaging plane relative to the focal length. When the distance (OAL) exceeds an upper limit (2.00), it cannot be said that the total optical length may be sufficiently shortened, and not only the optical system 2 but also the entire photographing device 1 cannot be miniaturized.

In addition, the above formula (3) specifies the maximum lateral magnification of the entire optical system 2, that is, a ratio (B) of a height of an image on the imaging plane to a height of an object of a subject. When the absolute value of this numerical value is lower than a lower limit (0.50), it cannot be said that a close-range photographing may be fully realized and a distance from the object that may be photographed cannot be shortened.

Therefore, in the optical system 2 of the present embodiment, the above three formulas (formula (1), formula (2), and formula (3)) are satisfied at the same time, thereby realizing an optical system 2 that has a small overall size and capable of photographing at a close range.

The maximum lateral magnification (B) of the entire optical system 2 is a numerical value indicating a degree of a close range photographing, and as mentioned above, it is expressed by a ratio of a height of the image on the photographing surface to a height of the object of the subject. For example, when photographing at a close range and |B| is 1.00, sizes of the subject and the photographing surface are equal, and when photographing at a long distance, |B| becomes close to 0.00.

In addition, in some examples, in the optical system 2 of the present embodiment, the lateral magnification (b3) satisfies the following formula.

$$0.90 \leq b3 \leq 2.00.$$

In some examples, the following formula is satisfied.

$$1.00 \leq b3 \leq 1.20.$$

In addition, in some examples, in the optical system 2 of the present embodiment, the distance (OAL) satisfies the following formula.

$$0.80 \leq OAL/f \leq 1.50.$$

In some examples, the following formula is satisfied.

$$0.90 \leq OAL/f \leq 1.00.$$

In addition, in some examples, in the optical system 2 of the present embodiment, the maximum lateral magnification (B) satisfies the following formula (3).

$$0.75 \leq |B|.$$

In some examples, the following formula is satisfied.

$$1.00 \leq |B|.$$

In addition, in the optical system 2 of the photographing device 1, when a refractive index of a lens having a positive refractive power based on a d-line is nd2p, an Abbe number of the lens having a positive refractive power based on the d-line is vd2p, and a variable is A, the optical system 2 may satisfy the following formulas (4), (5) and (6).

$$nd2p = -0.01 \times vd2p + A \tag{4}$$

$$1.55 \leq nd2p \leq 1.72 \tag{5}$$

$$1.82 \leq A \leq 1.94 \tag{6}$$

In the optical system 2 that satisfies the above formulas (4), (5), and (6), similarly, among the plurality of lens groups G arranged along the optical axis C, the first lens group 21 having a positive refractive power is arranged closest to the object side, the second lens group 22 having a negative refractive power is arranged at an image side of the first lens group 21, and the third lens group 23 having a positive or negative refractive power is arranged closest to the image side. Thus, the optical power arrangement of telephoto may be easily obtained in the optical system 2, and therefore, the focal length of the first lens group 21 may be shortened, resulting in that miniaturization of the optical system 2 (specifically, miniaturization in the direction of the optical axis C) may be realized.

Moreover, in the optical system 2 satisfying the formulas (4), (5) and (6), similarly, by moving the second lens group when focusing, the aberration variation balance with the front and rear lens groups 21 and 23 may be adjusted, bending variation of the imaging plane during a close range photographing may be suppressed compared with a whole extension mode, and therefore the close range photographing distance may be further shortened.

Furthermore, in the optical system 2 satisfying the formulas (4), (5) and (6), similarly, by fixing the first lens group 21 and the third lens group 23 relative to the imaging plane, only the second lens group 22 is set as a movable lens group, so that a load on a mechanism or actuator may be reduced, and therefore, the overall miniaturization of the photographing device 1 including the optical system 2 may be realized.

The above formula (5) specifies a range of the refractive index (nd2p) of the lens having a positive refractive power based on the d-line. When the refractive index (nd2p) is lower than a lower limit (1.55), a positive focal power in the second lens group 22 becomes weak, and it is difficult to correct spherical aberration, imaging plane bending and other aberrations in the whole focus area. On the other hand, when the refractive index (nd2p) exceeds an upper limit (1.72), the positive focal power of the second lens group 22 becomes strong, and it is difficult to improve the negative focal power of the entire second lens group 22. As a result, a movement amount for the focusing becomes large, and therefore it is difficult to miniaturize the optical system 2.

In addition, the above-mentioned formula (6) specifies a range of the variable A in the above-mentioned formula (4), thereby determining a range of the Abbe number (vd2p) of the lens having a positive refractive power based on the d-line. If a lens material outside the range of the Abbe number (vd2p) is used, it will be difficult to perform good chromatic aberration correction in the entire focus area, or the number and weight of the lenses of the second lens group 22 will increase, resulting in an increase in the size of actuators and other driving devices.

Therefore, in the above optical system 2, the above three formulas (formula (4), formula (5) and formula (6)) are satisfied at the same time, so that an optical system 2 that has a small overall size and is capable of photographing at a close range may be realized.

In addition, in some examples, in the optical system 2 satisfying the above-mentioned formulas (4), (5) and (6), the above refractive index (nd2p) satisfies:

$$1.57 \leq nd2p \leq 1.70.$$

In some examples, the following formula is satisfied:

$$1.59 \leq nd2p \leq 1.68.$$

In addition, in some examples, in this optical system 2, the above variable (A) satisfies:

$$1.84 \leq A \leq 1.92.$$

In some examples, the following formula is satisfied:

$$1.86 \leq A \leq 1.90.$$

In addition, in the optical system 2, the second lens group 22 has at least one lens having a positive refractive power and at least one lens having a negative refractive power. In the second lens group 22, a lens 221 having the strongest positive refractive power may be arranged at a position closer to the image side than a lens 222 having the strongest negative refractive power.

According to this configuration, the aberration correction may be achieved in the entire focus area from infinity to close range photographing just by moving the second lens group 22. The details are as follows.

In order to realize the aberration correction in the whole focus area from infinity to close range photographing just by moving the second lens group 22, an on-axis light beam that is strongly converged by the first lens group 21 on the object side of the second lens group 22 is regarded as a properly converged light beam and, in embodiments, a peripheral light beam needs a negative focal power to jump up and be guided to the image side of the second lens group 22. In addition, on the image side of the second lens group 22, a positive focal power is required for convergence to obtain a desired F number.

Therefore, in the optical system 2 of the present embodiment, as the configuration described above, the second lens group 22 has at least one lens having a positive refractive power and at least one lens having a negative refractive power. By adopting a configuration in which the lens 221 having the strongest positive refractive power is located at the position closer to the image side than the lens 222 having the strongest negative refractive power in the second lens group 22, a proper aberration correction in the whole focus area from infinity to close range photographing may be achieved just by moving the second lens group 22.

In addition, in the optical system 2, when the lateral magnification of the second lens group focusing at infinity is b2 and the lateral magnification of the third lens group focusing at infinity is b3, the optical system 2 may satisfy the following formula (7).

$$-10.00 \leqslant \left(1 - b2^2\right) \times b3^2 \leqslant -2.00 \tag{7}$$

The above formula (7) specifies a ratio $((1-b2^2) \times b3^2)$ of a movement amount of the imaging plane to a movement amount of the second lens group 22 in the direction of the optical axis C. In the optical system with the whole extension mode, a numerical value corresponding to this formula is 1. However, in the internal focus optical system of the optical system 2 of the present embodiment, by increasing this ratio with a negative value, a close range photographing may be realized with a small movement amount, and the miniaturization of the entire optical system 2 is realized. When the ratio $((1-b2^2) \times b3^2)$ is less than a lower limit (−10.00), the movement amount of the imaging plane relative to the movement amount of the second lens group 22 in the direction of the optical axis C becomes too large to improve accuracy of the stop position of the second lens group 22 by a driving device such as an actuator. However, when the ratio $((1-b2^2) \times b3^2)$ exceeds an upper limit (−2.00), the movement amount of the second lens group 22 for a close range photographing increases, so it is difficult to realize the miniaturization of the entire optical system 2. Therefore, in the optical system 2 of the present embodiment, by setting the ratio $((1-b2^2) \times b3^2)$ of the movement amount of the imaging plane to the movement amount of the second lens group 22 in the direction of the optical axis C within the above-mentioned formula (7), it is possible to achieve a balance between improving the accuracy of the stop position of the second lens group 22 by an actuator or the like during focusing and the miniaturization of the entire optical system 2.

In addition, in some examples, in the optical system 2 of the present embodiment, the above ratio $((1-b2^2) \times b3^2)$ satisfies the following formula.

$$-9.00 \leqslant \left(1 - b2^2\right) \times b3^2 \leqslant -2.50$$

In some examples, the following formula is satisfied the following formula.

$$-8.00 \leqslant \left(1 - b2^2\right) \times b3^2 \leqslant -5.00$$

In addition, in the optical system 2, when the focal length of the entire optical system focusing at infinity is f and the focal length of the above-mentioned second lens group is f2, the optical system 2 may satisfy the following formula (8).

$$-0.70 \leqslant f2/f \leqslant -0.10 \tag{8}$$

The above formula (8) specifies a ratio (f2/f) of the focal length of the second lens group 22 to the focal length of the entire optical system 2 focusing at infinity. When this ratio (f2/f) is lower than a lower limit (−0.70), the focal power of the second lens group 22 becomes weak, and the movement amount of the second lens group 22 for a close range photographing becomes large, so it is difficult to realize the miniaturization of the entire optical system 2. On the other hand, when the ratio (f2/f) exceeds an upper limit (−0.10), the movement amount of the imaging plane relative to the movement amount of the second lens group 22 in the direction of the optical axis C becomes too large to improve the accuracy of the stop position of the second lens group 22 by a driving device such as an actuator. Therefore, in the optical system 2 of the present embodiment, by setting the ratio (f2/f) of the focal length of the second lens group 22 to the focal length of the entire optical system 2 focusing at infinity within the above-mentioned formula (8), it is possible to achieve a balance between the miniaturization of the entire optical system 2 and improvement of the accuracy of the stop position of the second lens group 22 by an actuator or the like during focusing.

In addition, in some examples, in the optical system 2 of the present embodiment, the above ratio (f2/f) satisfies the following formula.

$$-0.65 \leqslant f2/f \leqslant -0.15$$

In some examples, the following formula is satisfied the following formula.

$$-0.60 \leqslant f2/f \leqslant -0.02$$

According to the optical system 2 configured as above and the photographing device 1 having the optical system 2, the miniaturation and the close range photographing may be realized. That is, in the optical system 2 of the present embodiment in which the first lens group 21 has a positive refractive power, the second lens group 22 has a negative refractive power, and the third lens group 23 has a positive or negative refractive power, and the second lens group 22 is movable when focusing from infinity to close range, by appropriately selecting the configurations, magnifications, lens materials, etc. of the lens groups 21 to 23, an optical system, which has a small overall size, and fully realizes the performance and chromatic aberration correction at a close range photographing, may be realized.

In addition, in the optical system 2 and the photographing device 1 having the optical system 2 according to the present embodiment, even in the so-called internal focus optical system, the miniaturization and the like of the optical system 2 and the photographing device 1 having the optical system 2 may be realized. The details are as follows.

As a conventional focusing method of a lens, an optical system with a whole extension mode is known. The optical system with a whole extension mode adopts a way of extending the entire optical system to the object side when focusing from infinity to close range, and the entire optical system is fixed as one without being divided into subgroups, so it is relatively easy to improve the optical performance when designing. However, when the entire lens is focused, there is a difference between the positions where the lens system of a peripheral image high beam passes between infinity and close range focus, and the variation of imaging plane bending becomes larger, and its aberration is difficult to correct. In addition, a movement distance of the entire lens during focusing increases in proportion to the square of the focal length. Therefore, especially for a telephoto lens with a long focal length, in order to achieve the close range photographing, the movement amount of focusing becomes longer, and as a result, it is difficult to realize the miniaturization of the optical system and the photographing device.

On the other hand, the internal focus optical system, when focusing from infinity to close range, adopts a way of moving some lens groups in the optical system to the object side or the image side. Because the aberration correction corresponding to the object distance is distributed to respective groups, it is easier to correct the aberration in the focusing range. In addition, the sensitivity of the movement distance of the focus group during focusing may be improved, and the movement amount may be easily shortened.

Therefore, in the photographing device 1 of the present embodiment, even when the internal focus optical system is adopted as the optical system 2, it is possible to realize an optical system that has a small overall size and can fully realize the performance and chromatic aberration correction during the close range photographing.

Embodiments 1 to 5 of the optical system of the present disclosure will be described. In the following embodiments, the same reference numerals are used for the components corresponding to the components of the optical system 2 of the above embodiments. In addition, in the tables of the following embodiments, r is a radius of curvature, d is a lens thickness or lens spacing, nd is a refractive index of the d-line, and vd represents an Abbe number based on the d-line. In addition, aspheric surface is defined by the following formula.

$$z = ch^2 / \left[ 1 + \left\{ 1 - (1 + k) \ c^2 h^2 \right\}^{1/2} \right] + A4h^4 + A6h^6 + A8h^8 + A10h^{10} \ \ldots \ \ldots$$

(Where, c is a curvature (1/r), h is a height from the optical axis, k is a conic coefficient, and A4, A6, A8 and A10 . . . are aspheric coefficients of each order).

In addition, each longitudinal aberration diagrams shows spherical aberration (SA (mm)), astigmatism (AST (mm)) and distortion (DIS (%)) in turn from the left. In the spherical aberration diagram, the vertical axis represents the F number (represented by FNO in the diagram), the solid-line represents the characteristics of the d-line, the short dashed-line represents the characteristics of a F-line, and the long dashed-line represents the characteristics of a C-line. In the astigmatism diagram, the vertical axis represents the maximum image height (represented by Y in the diagram), the solid-line represents the characteristics of the sagittal plane (represented by S in the diagram), and the dashed-line represents the characteristics of the meridian plane (represented by M in the diagram). In the distortion diagram, the vertical axis represents the maximum image height (represented by Y in the diagram).

Embodiment 1

Figure 2:
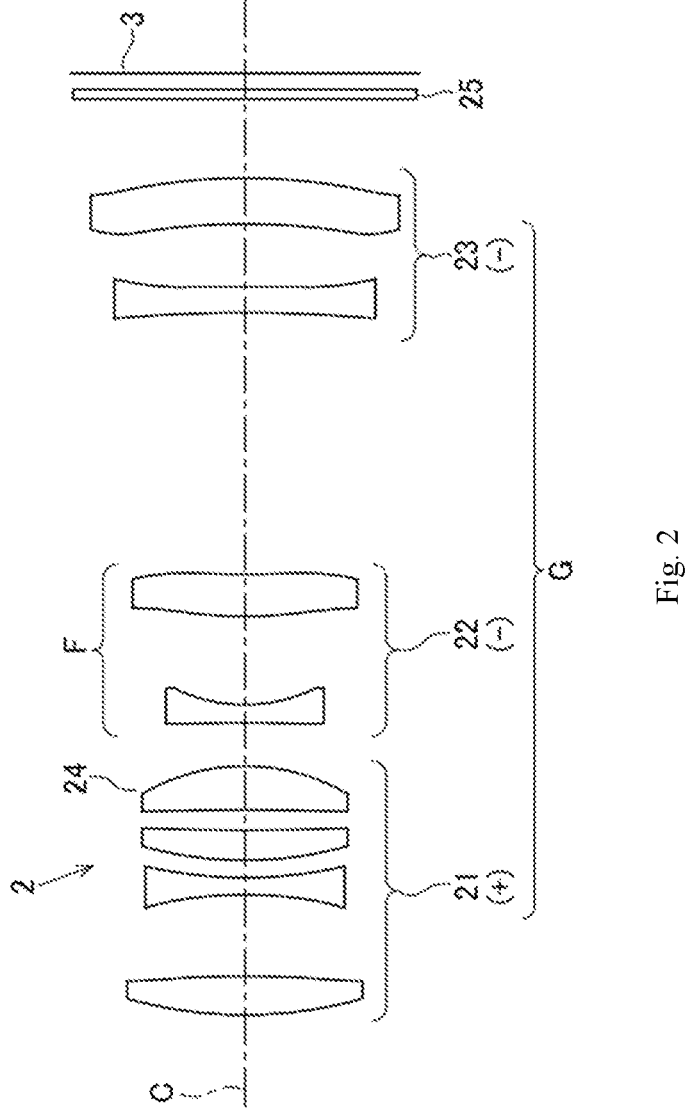
FIG. 2 is a lens configuration diagram of an optical system according to embodiment 1 in an infinity focus state.
Figure 3:
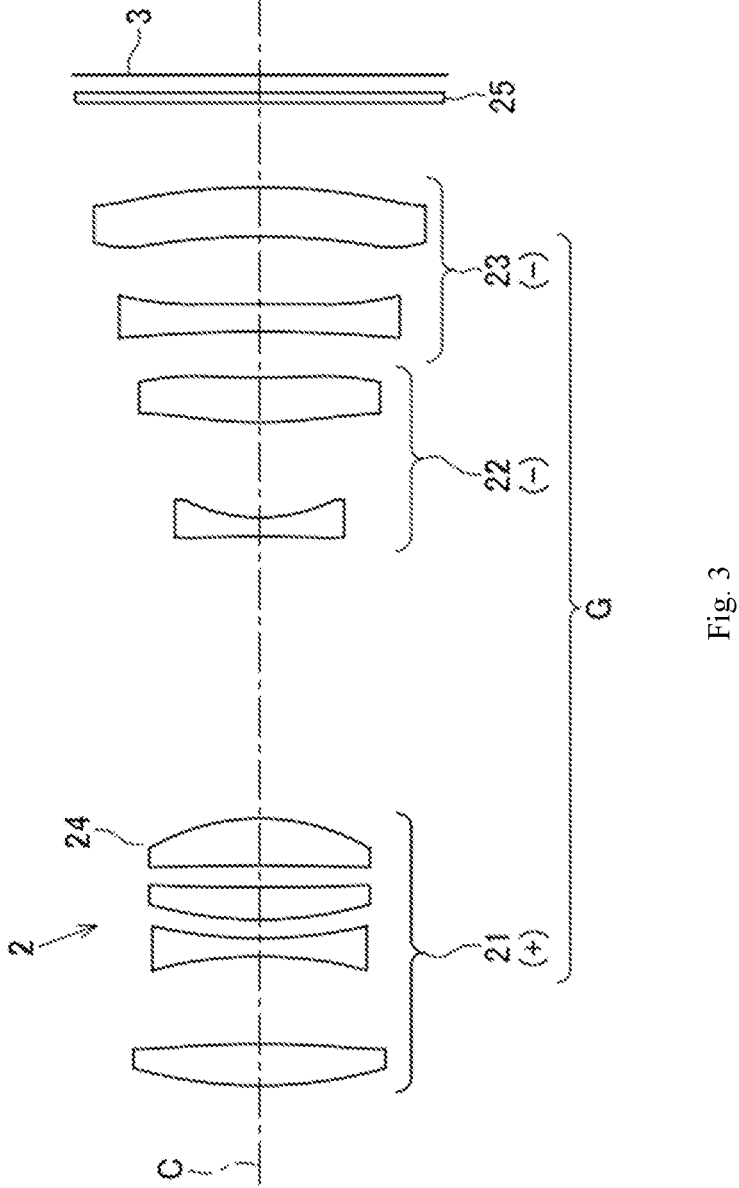
FIG. 3 is a lens configuration diagram of an optical system according to embodiment 1 in a closest focus state.

FIGS. 2 and 3 are lens configuration diagrams of an optical system according to Embodiment 1, with FIG. 2 showing an infinity focus state and FIG. 3 showing a closest focus state. In addition, the reference numerals indicating the configurations of the optical system are the same as those of the corresponding configurations of the optical system 2 of the above embodiments. In addition, in this optical system, when focusing, the positions of the first lens group 21 and the third lens group 23 on the optical axis C are fixed relative to the photographing element (imaging plane) 3.

Figure 4:
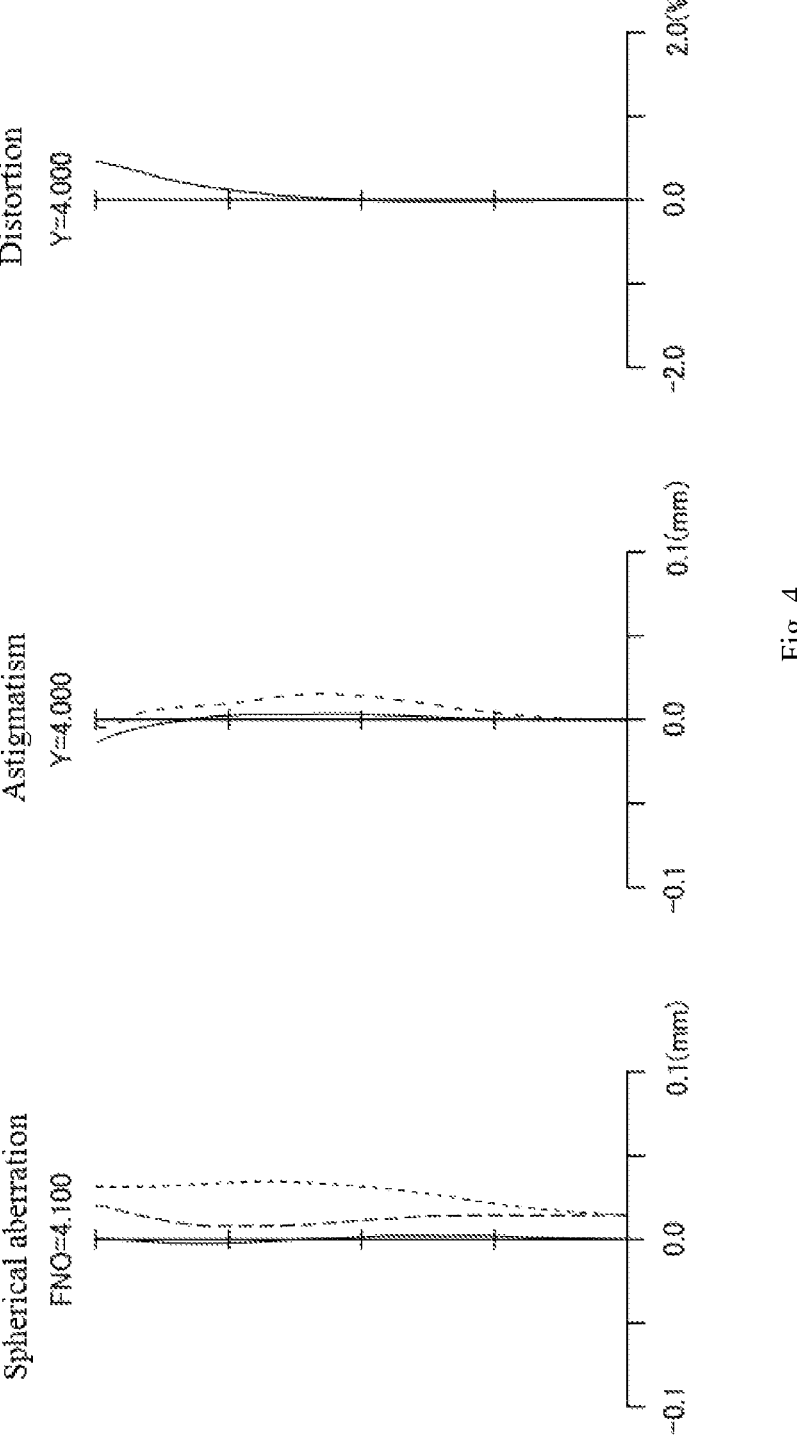
FIG. 4 is a longitudinal aberration diagram of an optical system according to embodiment 1 in an infinity focus state.
Figure 5:
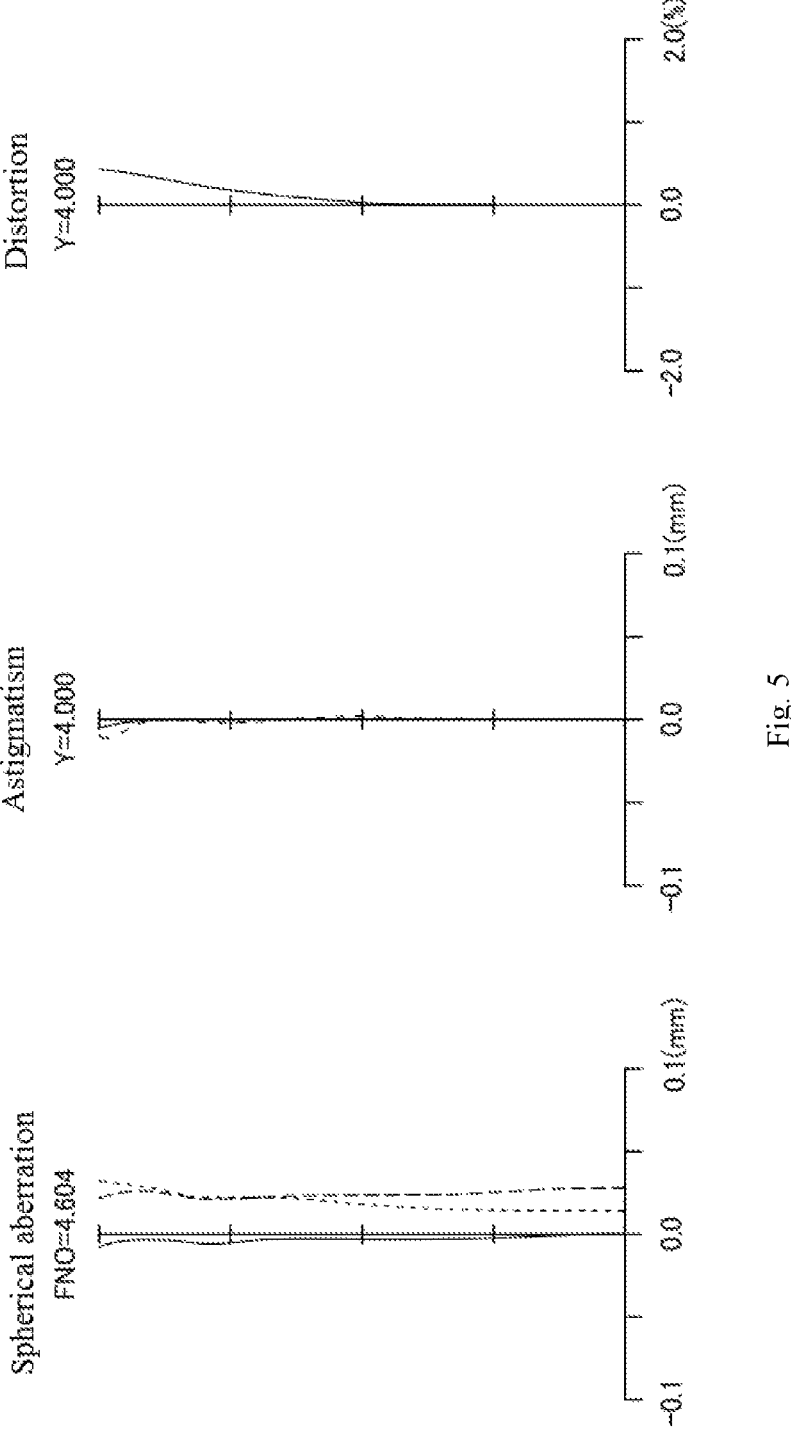
FIG. 5 is a longitudinal aberration diagram of an optical system according to embodiment 1 at a magnification of −0.5.
Figure 6:
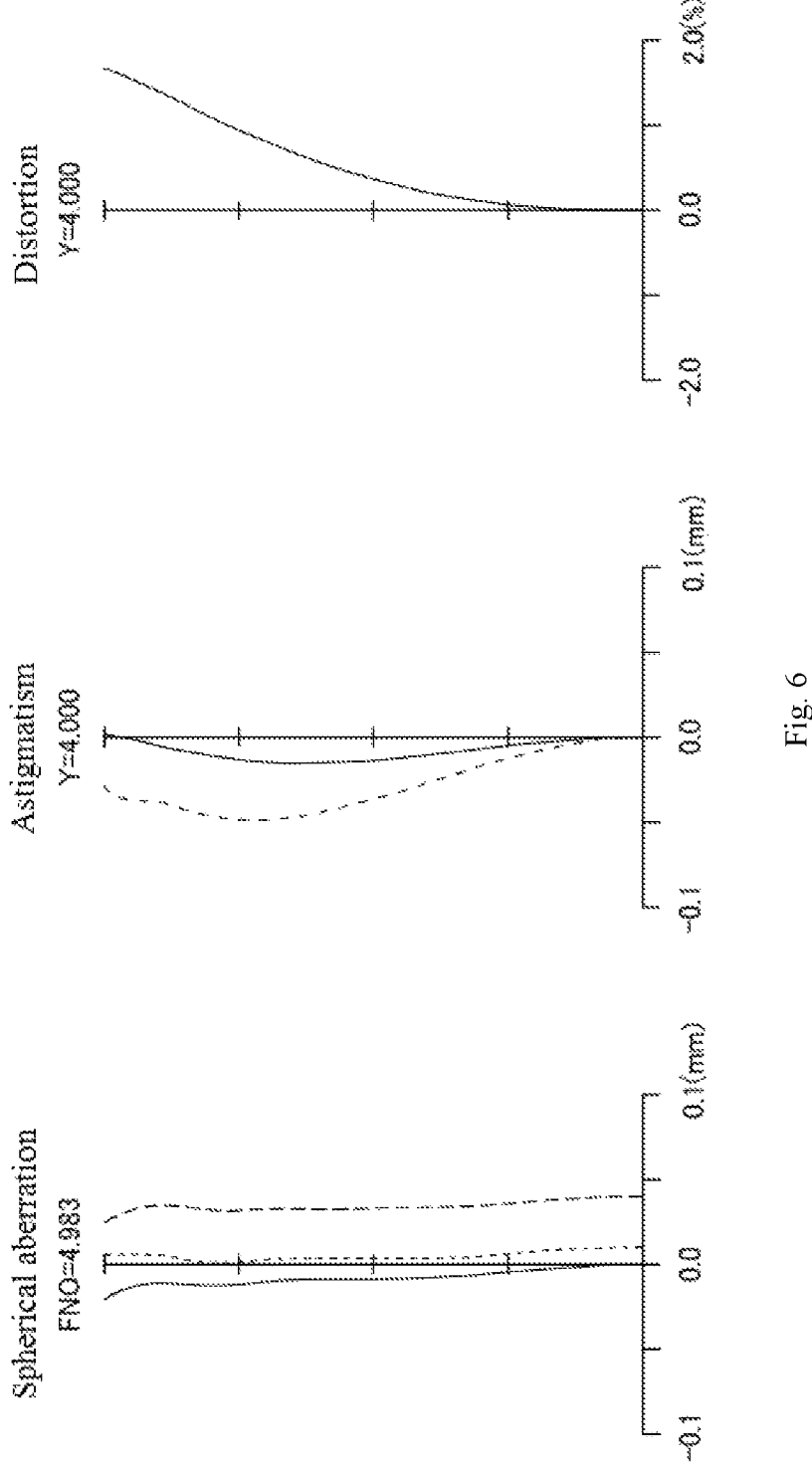
FIG. 6 is a longitudinal aberration diagram of an optical system according to embodiment 1 at a magnification of −1.0.

FIG. 4 is a longitudinal aberration diagram in an infinity focus state, FIG. 5 is a longitudinal aberration diagram at a magnification of −0.5, and FIG. 6 is a longitudinal aberration diagram at a magnification of −1.0. In addition, Table 1 below shows surface data of each lens, Table 2 shows aspheric surface data, Table 3 shows various data, Table 4 shows lens group data, and Table 5 shows individual lens data.

TABLE 1

| | Surface data | | | |
|---|---|---|---|---|
| Surface number | r | d | nd | vd |
| 1* | 10.837 | 0.889 | 1.5731 | 37.65 |
| 2* | −20.302 | 1.869 | | |
| 3* | −11.842 | 0.400 | 1.6422 | 22.40 |
| 4* | 8.631 | 0.400 | | |
| 5* | 7.439 | 0.701 | 1.5445 | 55.96 |
| 6* | −1016.183 | 0.459 | | |
| 7* | −244.855 | 1.007 | 1.5445 | 55.96 |
| 8* | −4.791 | d8 | | (Aperture diaphragm) |
| 9* | −23.884 | 0.400 | 1.5445 | 55.96 |
| 10* | 3.953 | 2.049 | | |
| 11* | 7.996 | 0.959 | 1.6714 | 19.27 |
| 12* | 20.258 | d12 | | |
| 13* | −26.885 | 0.600 | 1.6714 | 19.27 |
| 14* | −127.054 | 1.443 | | |

TABLE 1-continued

| Surface number | r | d | nd | vd |
|---|---|---|---|---|
| | | Surface data | | |
| 15* | −14.148 | 1.060 | 1.5731 | 37.65 |
| 16* | −18.241 | 1.822 | | |
| 17 | ∞ | 0.210 | 1.5168 | 64.20 |
| 18 | ∞ | 0.390 | | |

*for aspheric surface

TABLE 2

Aspheric surface data (the aspheric coefficient not shown is 0.00.)

| Surface number | k | A4 | A6 | A8 | A10 |
|---|---|---|---|---|---|
| 1 | 0.0000E+00 | −1.1639E−05 | 6.0054E−05 | 8.6396E−06 | −2.2041E−07 |
| 2 | 0.0000E+00 | 5.8633E−04 | 7.3252E−05 | 7.4744E−06 | −5.8661E−07 |
| 3 | 0.0000E+00 | −7.0037E−04 | −1.9898E−04 | −1.8774E−05 | 2.9685E−07 |
| 4 | 0.0000E+00 | −1.1742E−03 | −1.9847E−04 | −2.4243E−05 | 5.3635E−06 |
| 5 | 0.0000E+00 | −1.2877E−03 | −9.0202E−05 | −2.2704E−06 | 9.5701E−07 |
| 6 | 0.0000E+00 | 1.0370E−03 | 1.7134E−05 | 2.3536E−06 | −1.7400E−06 |
| 7 | 0.0000E+00 | −5.1023E−04 | −4.7470E−08 | −9.8188E−06 | 3.7361E−07 |
| 8 | 0.0000E+00 | −2.8113E−04 | −5.1933E−05 | −6.3363E−06 | 3.6540E−07 |
| 9 | 0.0000E+00 | 8.8416E−03 | −1.4970E−03 | 1.9667E−04 | −1.3207E−05 |
| 10 | 0.0000E+00 | 7.6667E−03 | −7.8779E−04 | 1.2420E−04 | −4.5422E−06 |
| 11 | 0.0000E+00 | −6.0882E−03 | 3.6197E−04 | −4.1107E−05 | 2.7115E−06 |
| 12 | 0.0000E+00 | −6.6253E−03 | 2.4105E−04 | −3.3557E−05 | 1.3859E−06 |
| 13 | 0.0000E+00 | 2.0583E−04 | 2.7586E−04 | −2.5465E−05 | −2.7532E−07 |
| 14 | 0.0000E+00 | 1.4314E−03 | 3.1864E−04 | −8.5224E−06 | −1.1200E−06 |
| 15 | 0.0000E+00 | −4.2498E−04 | 1.1331E−04 | 1.8972E−05 | −8.9180E−07 |
| 16 | 0.0000E+00 | −1.8677E−03 | 9.7671E−08 | −1.7520E−07 | 2.0773E−07 |

TABLE 3

Various data

| object distance | ∞ | 44.617 | 21.900 |
|---|---|---|---|
| lateral magnification | — | −0.5 times | − 1.0 times |
| F number | 4.100 | 4.604 | 4.983 |
| lens total length | 21.680 | 21.680 | 21.680 |
| d8 | 1.000 | 3.112 | 6.036 |
| d12 | 6.022 | 3.910 | 0.986 |

The focal length is 21.999, and the maximum image height is 4.000.

TABLE 4

Lens group data

| Group | Starting surface | Focal length | Lens configuration length | Lens movement amount | Magnification |
|---|---|---|---|---|---|
| 1 | 1 | 8.242 | 5.725 | 0.000 | — |
| 2 | 9 | −10.613 | 3.408 | 5.036 | 2.331 |
| 3 | 13 | −35.740 | 3.103 | 0.000 | 1.145 |

TABLE 5

Individual lens data

| Lens | Starting surface | Focal length |
|---|---|---|
| 1 | 1 | 12.458 |
| 2 | 3 | −7.715 |
| 3 | 5 | 13.566 |

TABLE 5-continued

Individual lens data

| Lens | Starting surface | Focal length |
|---|---|---|
| 4 | 7 | 8.981 |
| 5 | 9 | −6.197 |
| 6 | 11 | 19.077 |
| 7 | 13 | −50.915 |
| 8 | 15 | −121.484 |

Embodiment 2

Figure 7:
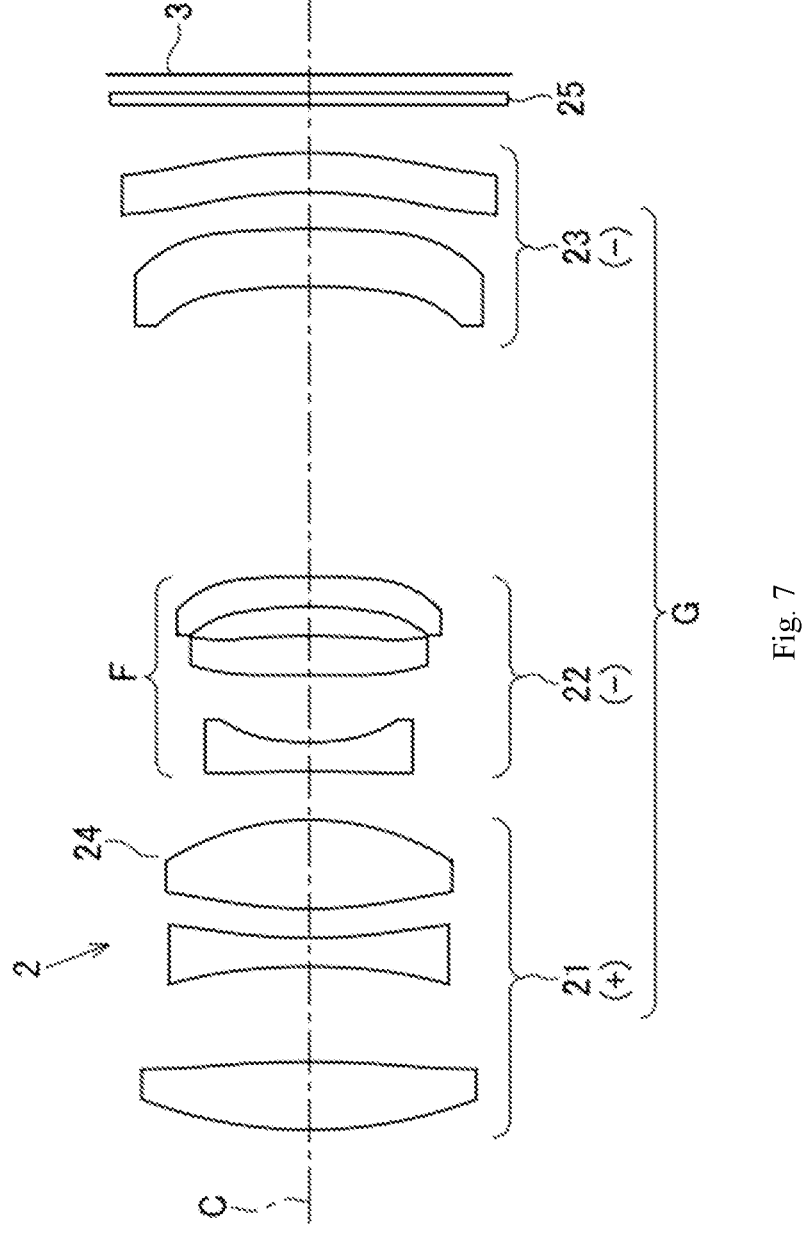
FIG. 7 is a lens configuration diagram of an optical system according to embodiment 2 in an infinity focus state.
Figure 8:
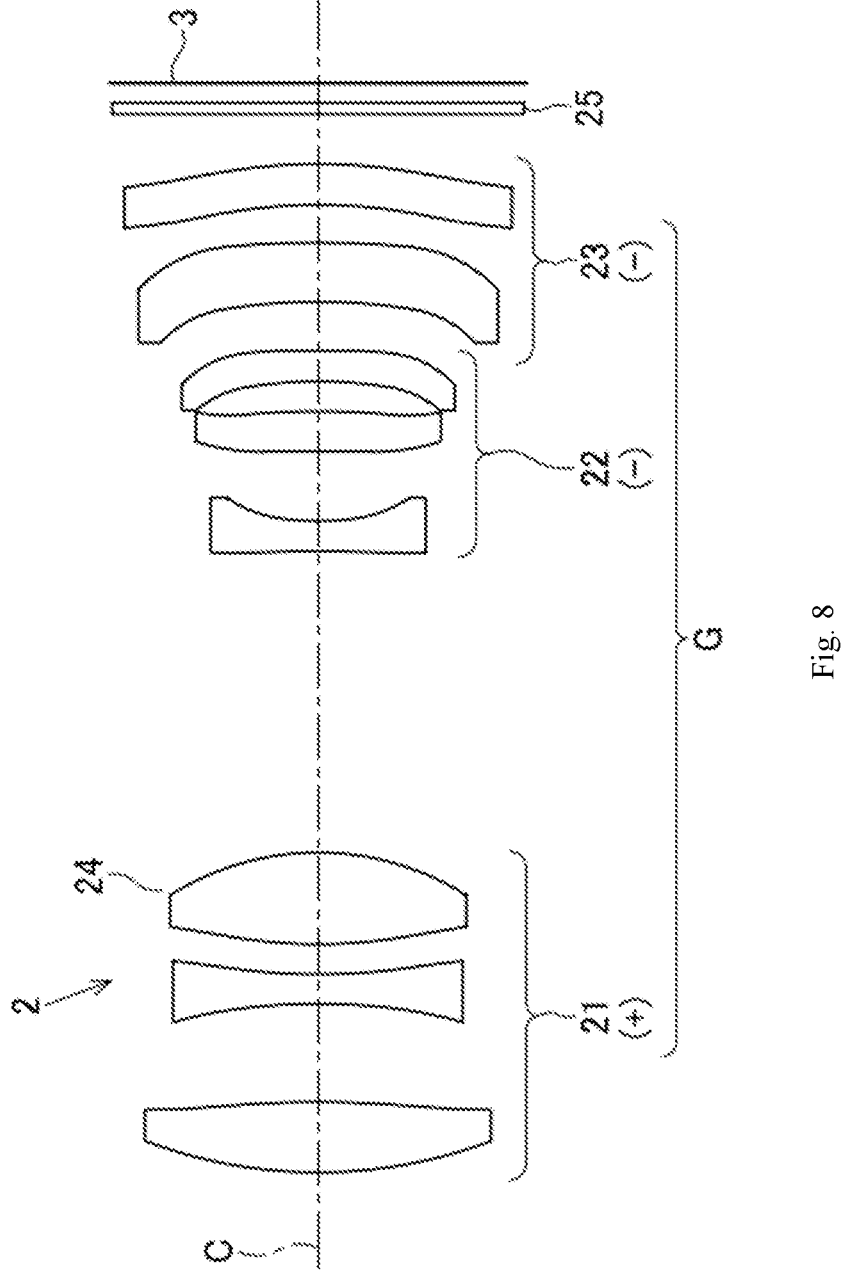
FIG. 8 is a lens configuration diagram of an optical system according to embodiment 2 in a closest focus state.

FIGS. 7 and 8 are lens configuration diagrams of an optical system according to Embodiment 2, with FIG. 7 showing an infinity focus state and FIG. 8 showing a closest focus state. In addition, the reference numerals indicating the configurations of the optical system are the same as those of the corresponding configurations of the optical system 2 of the above embodiment. In addition, in this optical system, similarly, when focusing, the positions of the first lens group 21 and the third lens group 23 on the optical axis C are fixed relative to the photographing element (imaging plane) 3.

Figure 9:
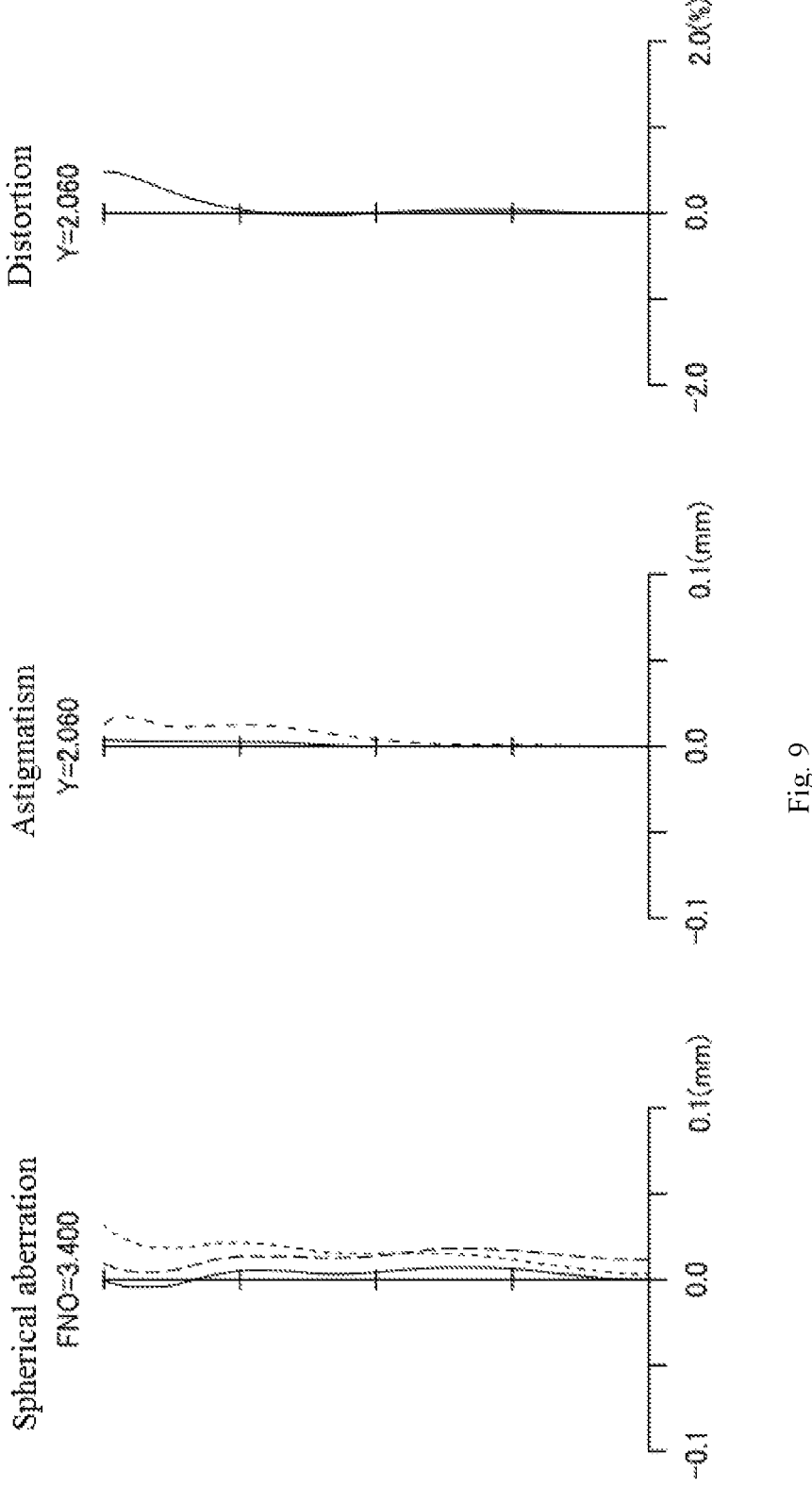
FIG. 9 is a longitudinal aberration diagram of an optical system according to embodiment 2 in an infinity focus state.
Figure 10:
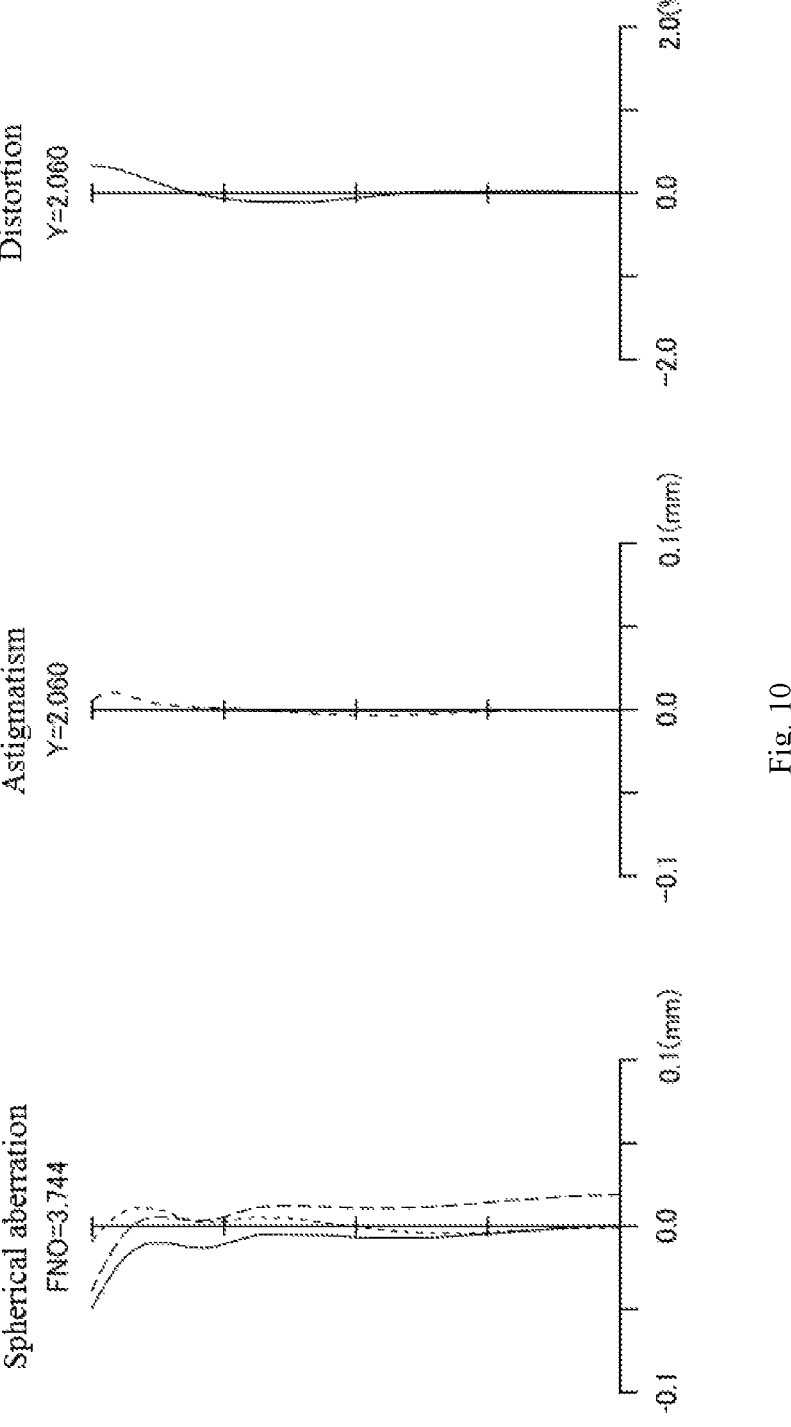
FIG. 10 is a longitudinal aberration diagram of an optical system according to embodiment 2 at a magnification of −0.5.
Figure 11:
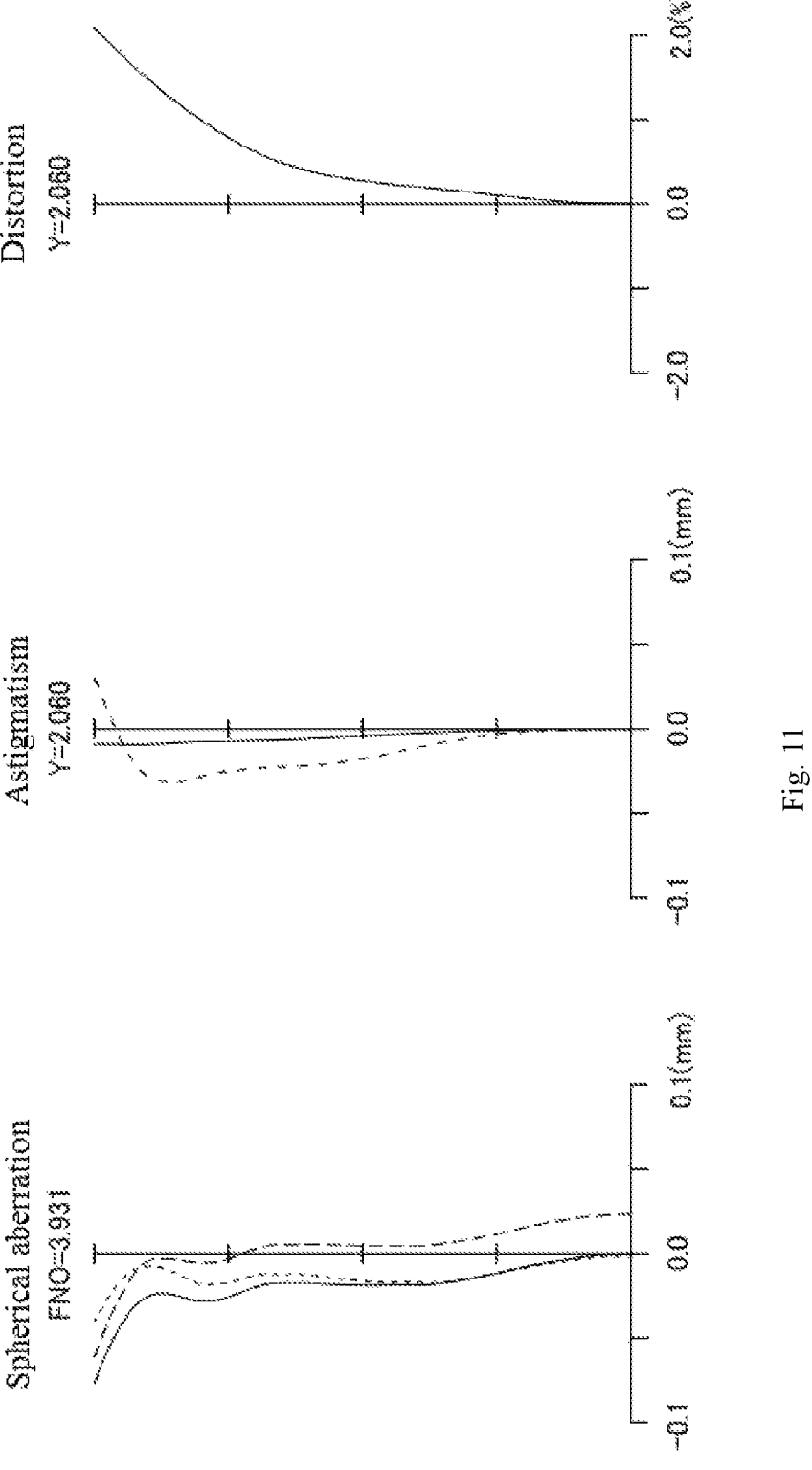
FIG. 11 is a longitudinal aberration diagram of an optical system according to embodiment 2 at a magnification of −1.0.

FIG. 9 is a longitudinal aberration diagram in an infinity focus state, FIG. 10 is a longitudinal aberration diagram at a magnification of −0.5, and FIG. 11 is a longitudinal aberration diagram at a magnification of −1.0. In addition, Table 6 below shows surface data of each lens, Table 7 shows aspheric surface data, Table 8 shows various data, Table 9 shows lens group data, and Table 10 shows individual lens data.

TABLE 6

Surface data

| Surface number | r | d | nd | vd | |
|---|---|---|---|---|---|
| 1* | 5.000 | 0.893 | 1.5731 | 37.65 | |
| 2* | −10.734 | 0.966 | | | |
| 3* | −8.150 | 0.300 | 1.6714 | 19.27 | |
| 4* | 5.654 | 0.300 | | | |
| 5* | 4.317 | 0.907 | 1.5445 | 55.96 | |
| 6* | −2.867 | d6 | | | (Aperture diaphragm) |
| 7* | −5.422 | 0.300 | 1.6445 | 55.96 | |

TABLE 6-continued

Surface data

| Surface number | r | d | nd | vd |
|---|---|---|---|---|
| 8* | 2.824 | 0.685 | | |
| 9* | 27.713 | 0.405 | 1.6714 | 19.27 |
| 10* | −8.501 | 0.300 | | |
| 11* | −10.352 | 0.300 | 1.5445 | 55.96 |
| 12* | 24.347 | d12 | | |
| 13* | −13.515 | 0.600 | 1.5445 | 55.96 |
| 14* | −25.363 | 0.368 | | |
| 15* | −6.612 | 0.407 | 1.6714 | 19.27 |
| 16* | −6.720 | 0.500 | | |
| 17 | ∞ | 0.105 | 1.5168 | 64.20 |
| 18 | ∞ | 0.195 | | |

*for aspheric surface

TABLE 7

Aspheric surface data (the aspheric coefficient not shown is 0.00.)

| Surface number | k | A4 | A6 | A8 | A10 |
|---|---|---|---|---|---|
| 1 | 0.0000E+00 | −2.3666E−03 | 2.0426E−05 | 6.8914E−04 | −6.1516E−05 |
| 2 | 0.0000E+00 | 1.6713E−03 | 8.7447E−04 | 7.9219E−04 | −1.5080E−04 |
| 3 | 0.0000E+00 | −1.9033E−03 | −1.1546E−03 | −4.6620E−04 | −4.3690E−04 |
| 4 | 0.0000E+00 | −3.2511E−03 | −3.0497E−03 | −6.7443E−04 | 1.5675E−04 |
| 5 | 0.0000E+00 | −1.1837E−02 | −2.7722E−03 | −7.9428E−04 | 4.8106E−04 |
| 6 | 0.0000E+00 | 4.1623E−04 | −4.6327E−04 | −1.2627E−03 | 3.9072E−04 |
| 7 | 0.0000E+00 | 1.4546E−01 | −1.0408E−01 | 4.7577E−02 | −9.9469E−03 |
| 8 | 0.0000E+00 | 1.6352E−01 | −6.6907E−02 | 2.2009E−02 | −1.6217E−04 |
| 9 | 0.0000E+00 | 9.3001E−03 | 3.1386E−02 | −3.5351E−03 | −2.5583E−03 |
| 10 | 0.0000E+00 | 4.5596E−03 | 1.5161E−02 | 2.1792E−02 | −1.1358E−02 |
| 11 | 0.0000E+00 | −1.2992E−01 | 2.1642E−02 | 2.9409E−02 | −2.0420E−02 |
| 12 | 0.0000E+00 | −1.3818E−01 | 3.8975E−02 | −5.9382E−03 | −4.1109E−03 |
| 13 | 0.0000E+00 | −2.9073E−02 | −8.7898E−03 | 2.5602E−04 | −1.9794E−05 |
| 14 | 0.0000E+00 | −2.6118E−02 | −6.2895E−03 | 9.2413E−04 | −6.0528E−05 |
| 15 | 0.0000E+00 | −1.7191E−02 | 9.6305E−03 | −3.2638E−04 | −1.8985E−04 |
| 16 | 0.0000E+00 | −1.7921E−02 | 6.5500E−03 | 1.1147E−03 | −3.4194E−04 |

TABLE 8

Various data

| | | | |
|---|---|---|---|
| object distance | ∞ | 23.135 | 10.954 |
| lateral magnification | — | −0.5 times | −1.0 times |
| F number | 3.400 | 3.744 | 3.931 |
| lens total length | 10.800 | 10.800 | 10.800 |
| d6 | 0.500 | 1.492 | 2.978 |
| d12 | 2.968 | 1.976 | 0.490 |

The focal length is 11.600 and the maximum image height is 2.060.

TABLE 9

Lens group data

| Group | Starting surface | Focal length | Lens configuration length | Lens movement amount | Magnification |
|---|---|---|---|---|---|
| 1 | 1 | 4.167 | 3.167 | 0.000 | — |
| 2 | 7 | −3.745 | 1.990 | 2.478 | 2.613 |
| 3 | 13 | −58.120 | 1.376 | 0.000 | 1.065 |

TABLE 10

Individual lens data

| Lens | Starting surface | Focal length |
|---|---|---|
| 1 | 1 | 6.049 |
| 2 | 3 | −4.929 |
| 3 | 5 | 3.311 |
| 4 | 7 | −3.367 |
| 5 | 9 | 9.733 |
| 6 | 11 | −13.299 |
| 7 | 13 | −54.100 |
| 8 | 15 | 1192.695 |

Embodiment 3

Figure 12:
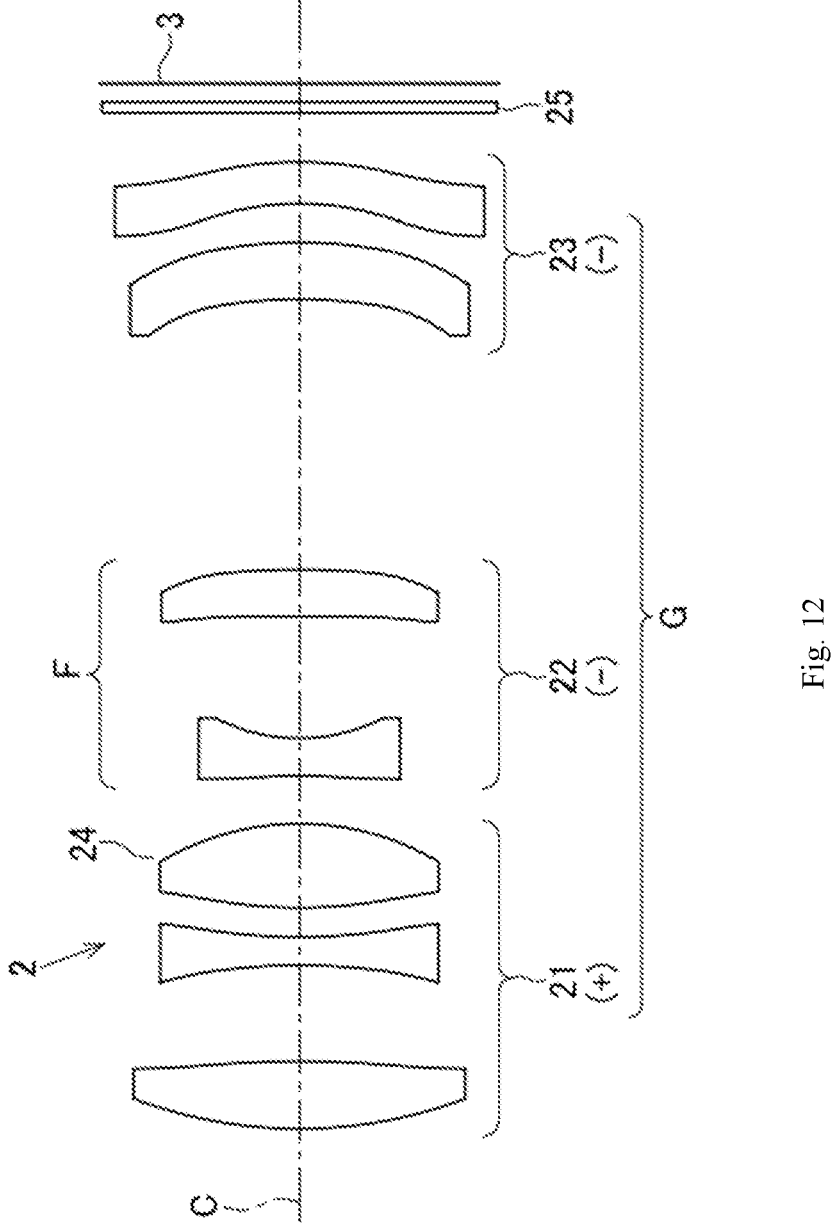
FIG. 12 is a lens configuration diagram of an optical system according to embodiment 3 in an infinity focus state.
Figure 13:
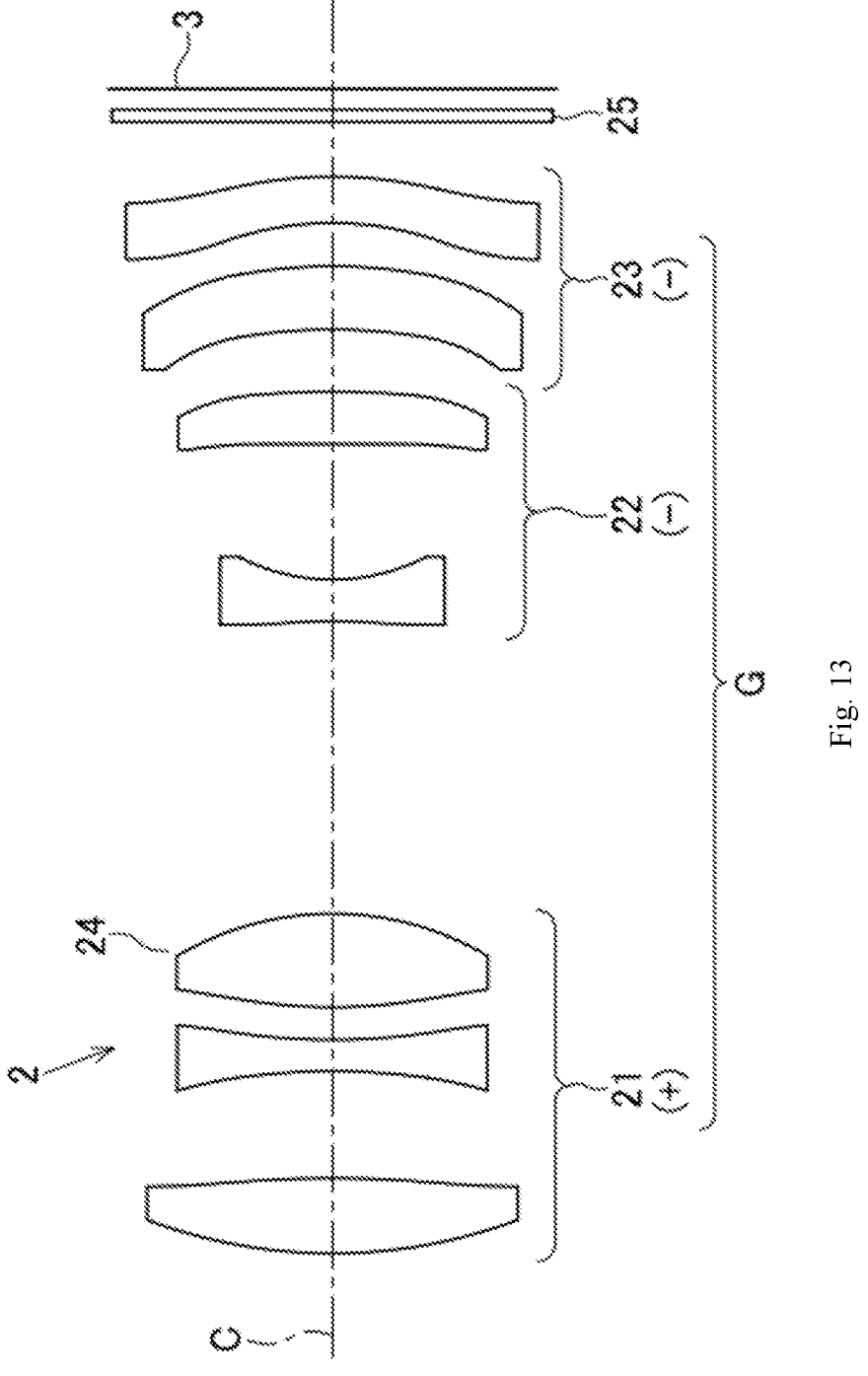
FIG. 13 is a lens configuration diagram of an optical system according to embodiment 3 in a closest focus state.

FIGS. 12 and 13 are lens configuration diagrams of the optical system according to Embodiment 3, with FIG. 12 showing an infinity focus state and FIG. 13 showing a closest focus state. In addition, the reference numerals indicating the configurations of the optical system are the same as those of the corresponding configurations of the optical system 2 of the above embodiment. In addition, in this optical system, similarly, when focusing, the positions of the first lens group 21 and the third lens group 23 on the optical axis C are fixed relative to the photographing element (imaging plane) 3.

Figure 14:
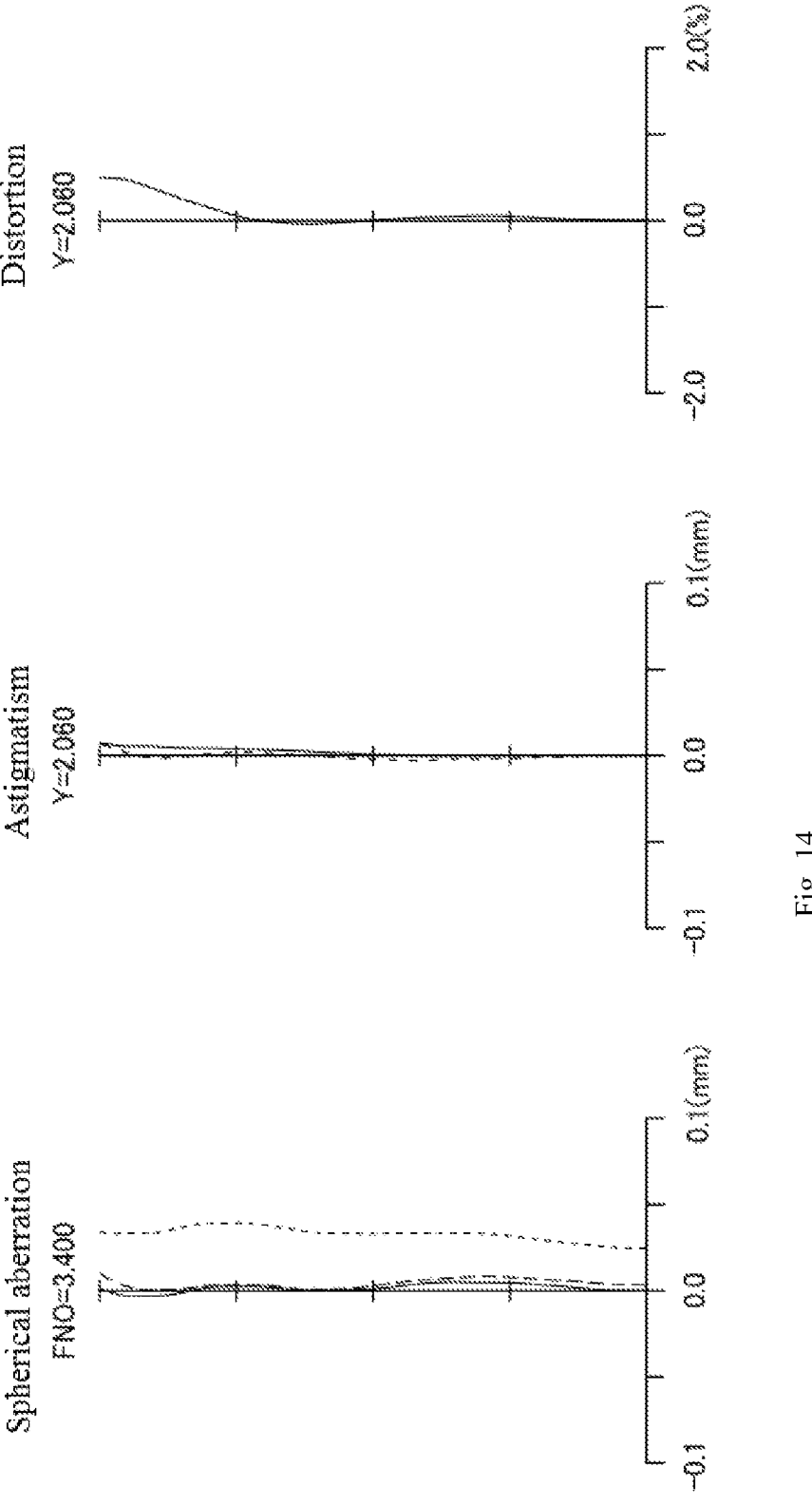
FIG. 14 is a longitudinal aberration diagram of an optical system according to embodiment 3 in an infinity focus state.
Figure 15:
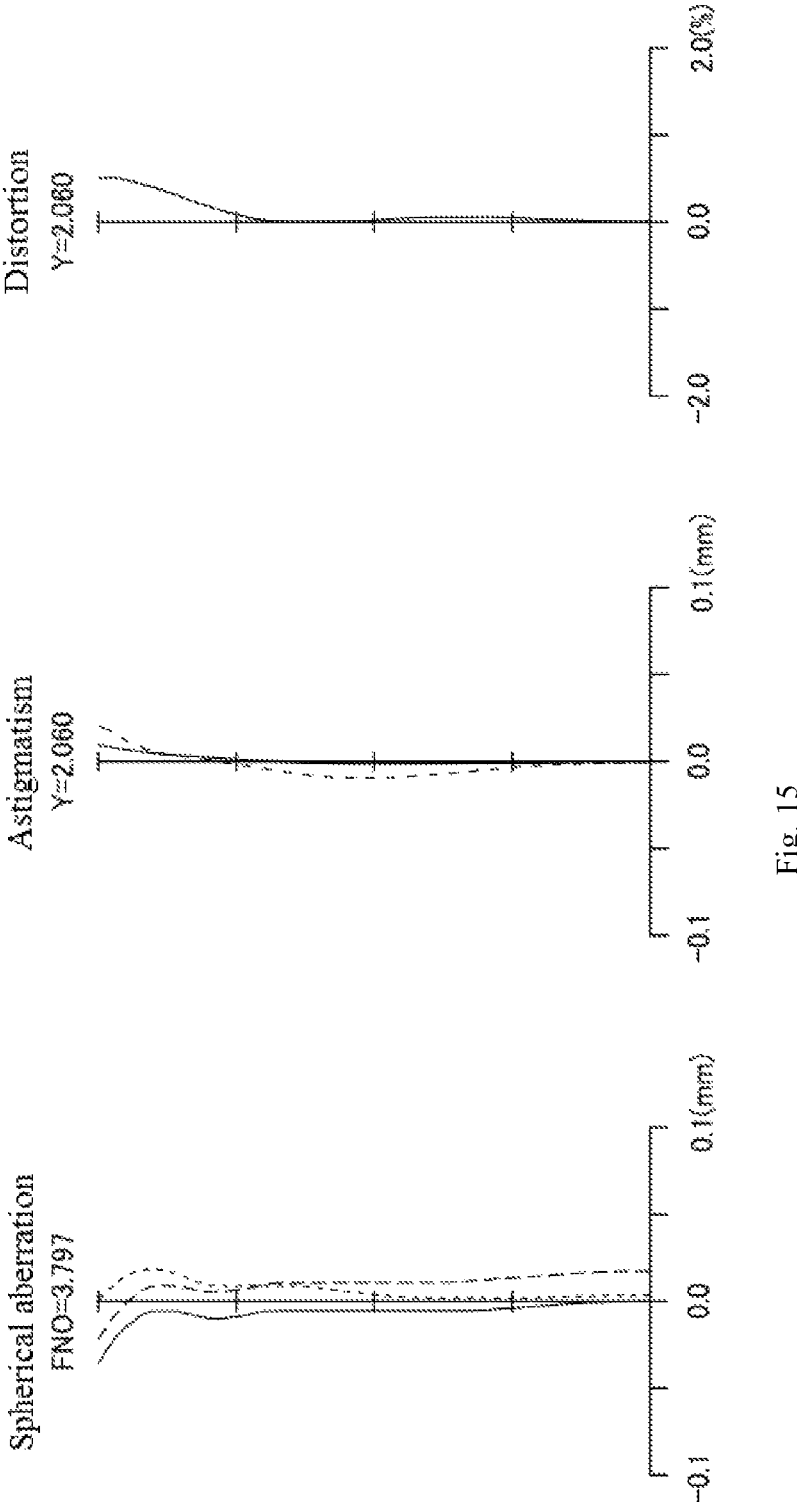
FIG. 15 is a longitudinal aberration diagram of an optical system according to embodiment 3 at a magnification of −0.5.
Figure 16:
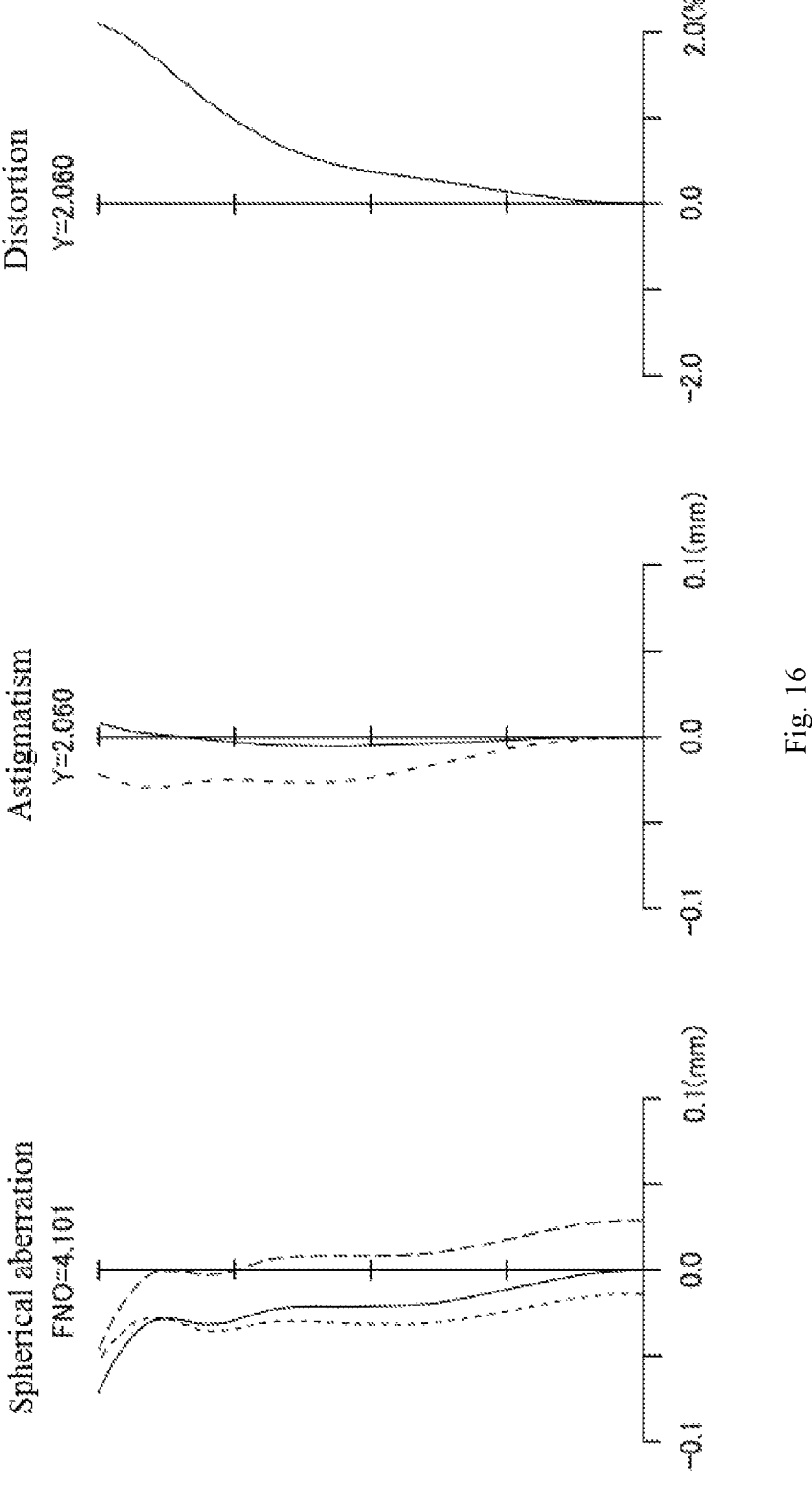
FIG. 16 is a longitudinal aberration diagram of an optical system according to embodiment 3 at a magnification of −1.0.

FIG. 14 is a longitudinal aberration diagram in an infinity focus state, FIG. 15 is a longitudinal aberration diagram at a magnification of −0.5, and FIG. 16 is a longitudinal aberration diagram at a magnification of −1.0. In addition, Table 11 below shows surface data of each lens, Table 12 shows aspheric surface data, Table 13 shows various data, Table 14 shows lens group data, and Table 15 shows individual lens data

TABLE 11

| Surface number | r | d | nd | vd | |
|---|---|---|---|---|---|
| | | | Surface data | | |
| 1* | 5.000 | 0.706 | 1.5731 | 37.65 | |
| 2* | −10.173 | 0.993 | | | |
| 3* | −8.056 | 0.300 | 1.6714 | 19.27 | |
| 4* | 6.129 | 0.300 | | | |
| 5* | 4.306 | 0.860 | 1.5445 | 55.96 | |
| 6* | −2.901 | d6 | | | (Aperture diaphragm) |
| 7* | −4.269 | 0.388 | 1.5445 | 55.96 | |
| 8* | 2.842 | 1.255 | | | |
| 9* | 33.107 | 0.481 | 1.6714 | 19.27 | |
| 10* | −20.856 | d10 | | | |
| 11* | −8.636 | 0.800 | 1.6714 | 19.27 | |
| 12* | −5.869 | 0.397 | | | |
| 13* | −2.388 | 0.432 | 1.5445 | 55.96 | |
| 14* | −3.516 | 0.500 | | | |
| 15 | ∞ | 0.105 | 1.5168 | 64.20 | |
| 16 | ∞ | 0.195 | | | |

*for aspheric surface

TABLE 12

Aspheric surface data (the aspheric coefficient not shown is 0.00.)

| Surface number | k | A4 | A6 | A8 | A10 |
|---|---|---|---|---|---|
| 1 | 0.0000E+00 | −1.9112E−03 | −1.5546E−05 | 6.7772E−04 | −6.1390E−05 |
| 2 | 0.0000E+00 | 1.8475E−03 | 7.8046E−04 | 7.4538E−04 | −1.4350E−04 |
| 3 | 0.0000E+00 | −2.4046E−03 | −1.4414E−03 | −5.4986E−04 | −4.4954E−04 |
| 4 | 0.0000E+00 | −3.2006E−03 | −3.1773E−03 | −7.5880E−04 | 1.7843E−04 |
| 5 | 0.0000E+00 | −1.2499E−02 | −2.9279E−03 | −8.2432E−04 | 5.1155E−04 |
| 6 | 0.0000E+00 | −2.6964E−04 | −7.1603E−04 | −1.2165E−03 | 3.9514E−04 |
| 7 | 0.0000E+00 | 1.4553E−01 | −1.0374E−01 | 5.0877E−02 | −1.1549E−02 |
| 8 | 0.0000E+00 | 1.6999E−01 | −7.855SE−02 | 3.6428E−02 | −3.2533E−03 |
| 9 | 0.0000E+00 | −3.2310E−02 | 7.0395E−03 | −3.1606E−03 | 9.0266E−04 |
| 10 | 0.0000E+00 | −4.4445E−02 | 4.4951E−03 | −2.4390E−03 | 1.8147E−04 |
| 11 | 0.0000E+00 | −2.7469E−02 | −6.6085E−03 | 2.3747E−04 | 3.3901E−04 |
| 12 | 0.0000E+00 | −2.1601E−02 | −8.6923E−04 | 5.7099E−04 | −1.0567E−05 |
| 13 | 0.0000E+00 | 3.5570E−02 | 6.5430E−03 | −7.4509E−04 | −6.9896E−05 |
| 14 | 0.0000E+00 | 2.5797E−02 | −3.5508E−03 | 2.0065E−03 | −3.3999E−04 |

TABLE 13

Various data

| object distance | ∞ | 23.360 | 11.411 |
|---|---|---|---|
| lateral magnification | — | −0.5 times | −1.0 times |
| F number | 3.400 | 3.797 | 4.101 |
| lens total length | 10.800 | 10.800 | 10.800 |
| d6 | 0.500 | 1.433 | 2.700 |
| d10 | 2.787 | 1.854 | 0.587 |

The focal length is 11.598, and the maximum image height is 2.060.

TABLE 14

Lens group data

| Group | Starting surface | Focal length | Lens configuration length | Lens movement amount | Magnification |
|---|---|---|---|---|---|
| 1 | 1 | 4.076 | 3.159 | 0.000 | — |
| 2 | 7 | −4.044 | 2.124 | 2.200 | 2.622 |
| 3 | 11 | −38.871 | 1.429 | 0.000 | 1.085 |

TABLE 15

Individual lens data

| Lens | Starting surface | Focal length |
|---|---|---|
| 1 | 1 | 5.950 |
| 2 | 3 | −5.141 |
| 3 | 5 | 3.323 |
| 4 | 7 | −3.074 |
| 5 | 9 | 19.127 |
| 6 | 11 | 25.097 |
| 7 | 13 | −15.804 |

Embodiment 4

Figure 17:
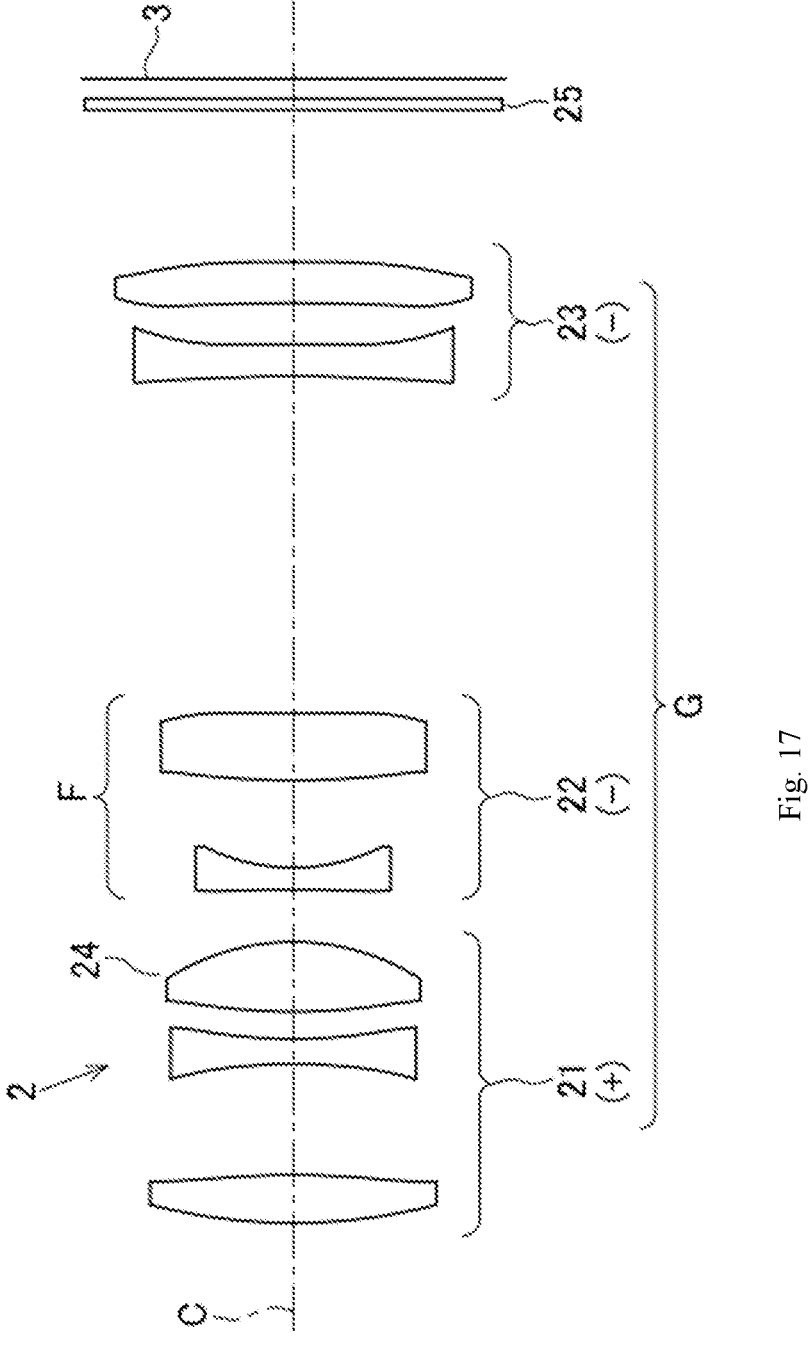
FIG. 17 is a lens configuration diagram of an optical system according to embodiment 4 in an infinity focus state.
Figure 18:
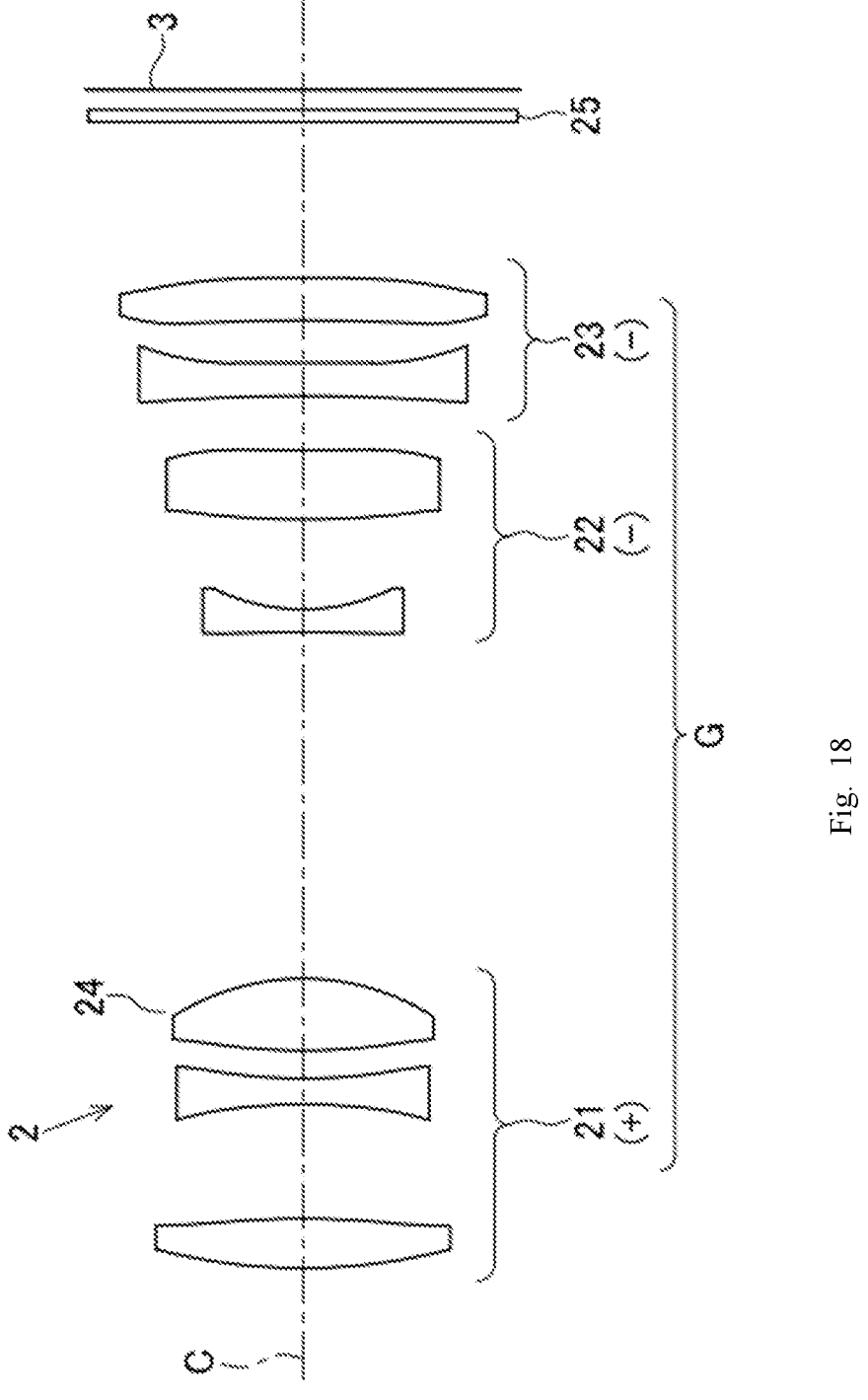
FIG. 18 is a lens configuration diagram of an optical system according to embodiment 4 in a closest focus state.

FIGS. 17 and 18 are lens configuration diagrams of the optical system according to Embodiment 4, with FIG. 17 showing an infinity focus state and FIG. 18 showing a closest focus state. In addition, the reference numerals indicating the configurations of the optical system are the same as those of the corresponding configurations of the optical system 2 of the above embodiment. In addition, in this optical system, similarly, when focusing, the positions of the first lens group 21 and the third lens group 23 on the optical axis C are fixed relative to the photographing element (imaging plane) 3.

Figure 19:
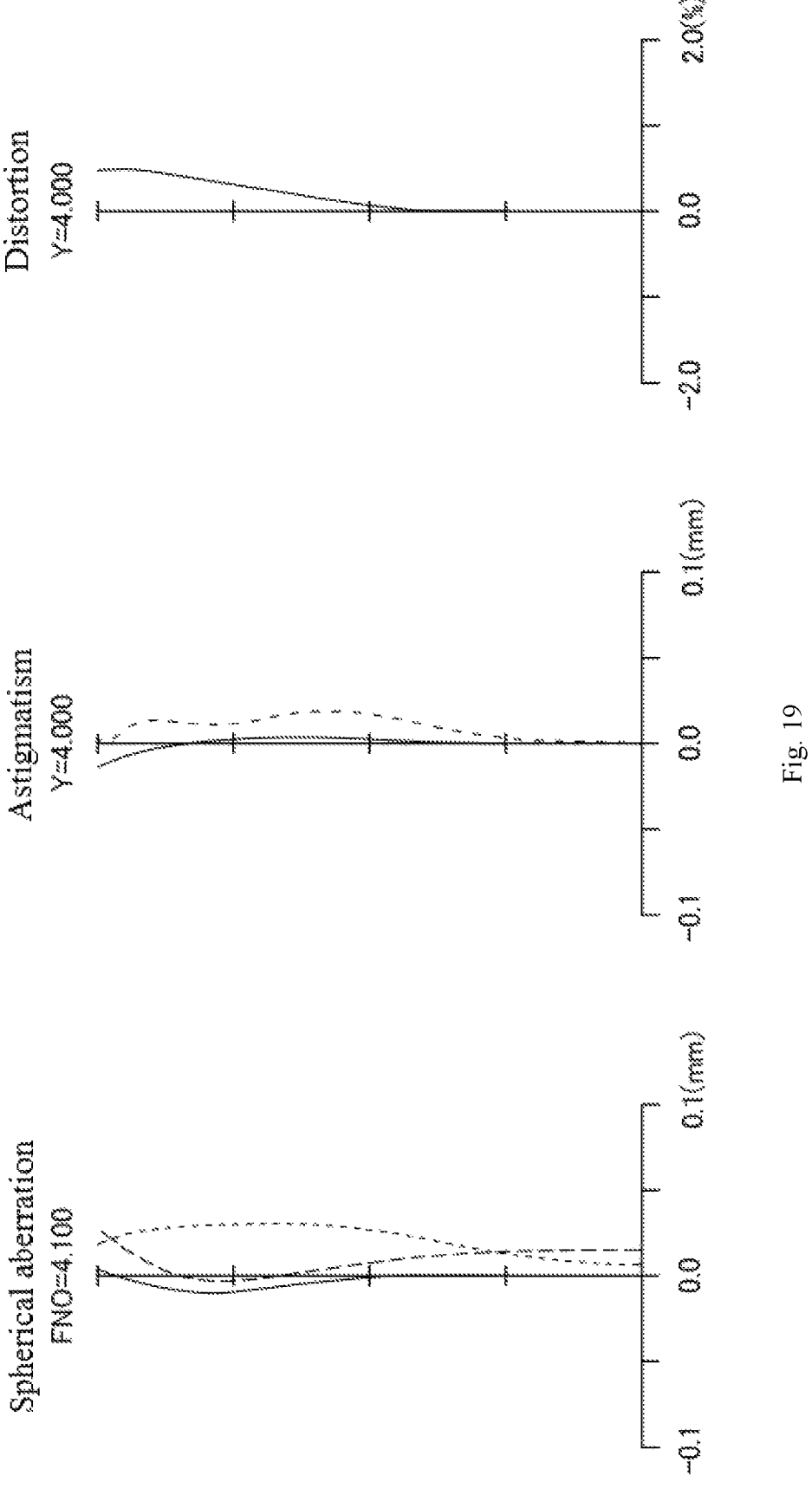
FIG. 19 is a longitudinal aberration diagram of an optical system according to embodiment 4 in an infinity focus state.
Figure 20:
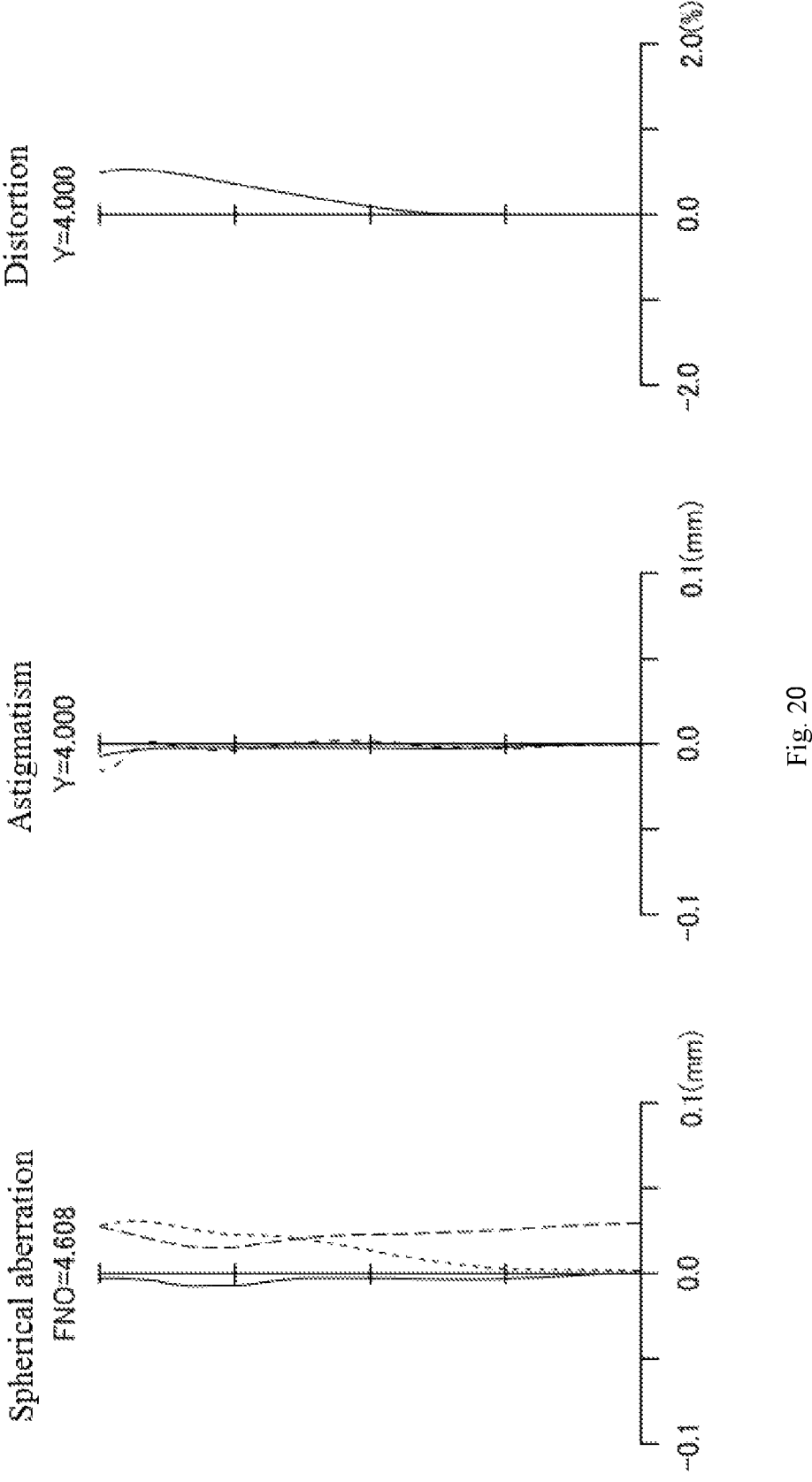
FIG. 20 is a longitudinal aberration diagram of an optical system according to embodiment 4 at a magnification of −0.5.
Figure 21:
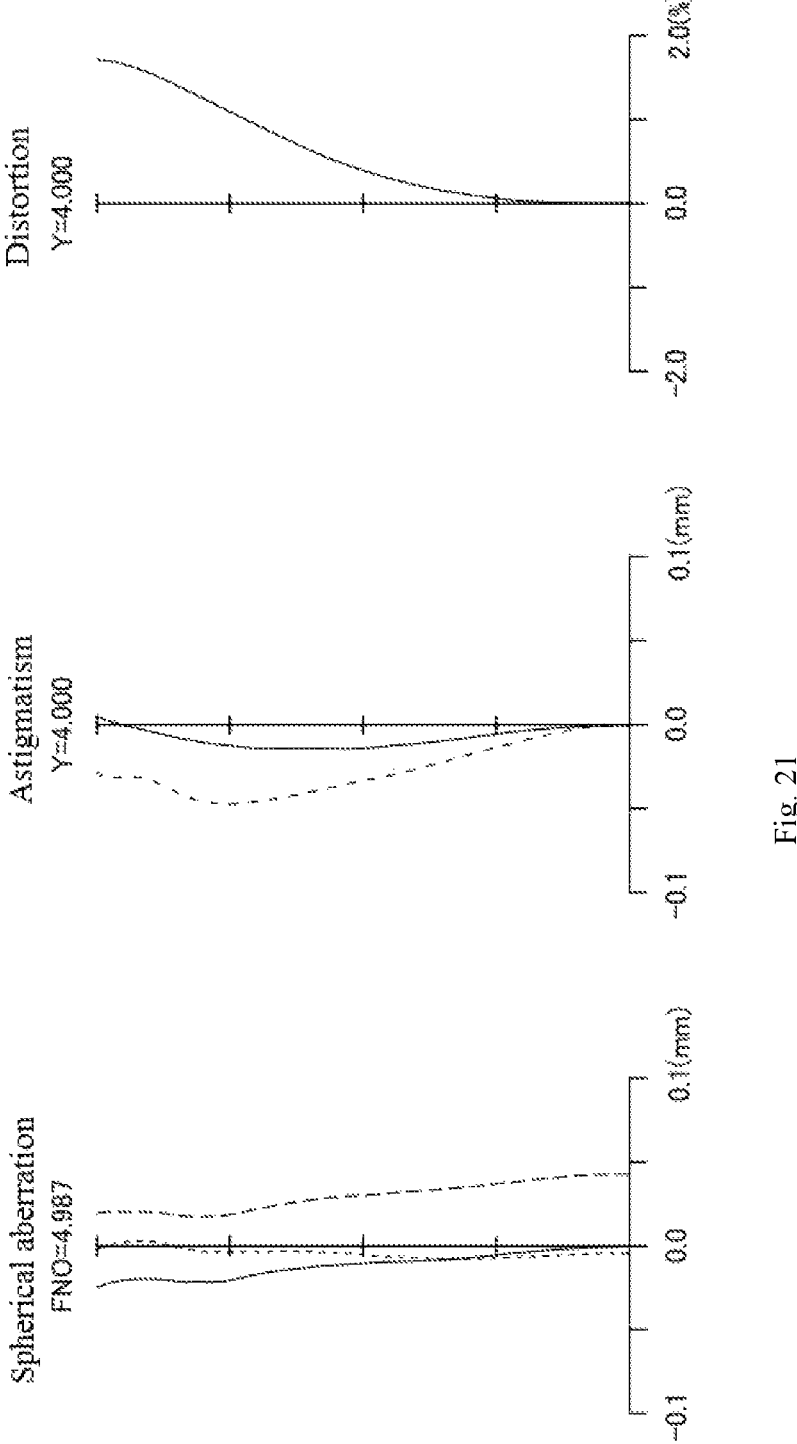
FIG. 21 is a longitudinal aberration diagram of an optical system according to embodiment 4 at a magnification of −1.0.

FIG. 19 is a longitudinal aberration diagram in an infinity focus state, FIG. 20 is a longitudinal aberration diagram at a magnification of −0.5, and FIG. 21 is a longitudinal aberration diagram at a magnification of −1.0. In addition, Table 16 below shows surface data of each lens, Table 17 shows aspheric surface data, Table 18 shows various data, Table 19 shows lens group data, and Table 20 shows individual lens data.

TABLE 16

| | | Surface data | | | |
|---|---|---|---|---|---|
| Surface number | r | d | nd | vd | |
| 1* | 11.363 | 0.891 | 1.5445 | 55.96 | |
| 2* | −16.648 | 2.105 | | | |
| 3* | −11.791 | 0.483 | 1.6161 | 25.78 | |
| 4* | 8.889 | 0.508 | | | |
| 5* | 9.425 | 1.316 | 1.5445 | 55.96 | |
| 6* | −4.732 | d6 | | | (Aperture diaphragm) |
| 7* | −18.298 | 0.400 | 1.5445 | 55.96 | |
| 8* | 4.125 | 1.654 | | | |
| 9* | 9.133 | 1.296 | 1.6560 | 21.25 | |
| 10* | 54.302 | d10 | | | |
| 11* | −24.402 | 0.600 | 1.6714 | 19.27 | |
| 12* | −292.433 | 0.788 | | | |
| 13* | −38.540 | 0.790 | 1.5880 | 28.42 | |
| 14* | −52.998 | 2.870 | | | |
| 15 | ∞ | 0.210 | 1.5168 | 64.20 | |
| 16 | ∞ | 0.390 | | | |

*for aspheric surface

TABLE 17

| | | Aspheric surface data (the aspheric coefficient not shown is 0.00.) | | | |
|---|---|---|---|---|---|
| Surface number | k | A4 | A6 | A8 | A10 |
| 1 | 0.0000E+00 | −2.4234E−04 | 6.7694E−05 | 9.5189E−06 | −3.2738E−07 |
| 2 | 0.0000E+00 | 7.4728E−04 | 8,5317E−05 | 7.9662E−06 | −8.4874E−07 |
| 3 | 0.0000E+00 | −1.0455E−03 | −2.7135E−04 | −2.4506E−05 | −1.2958E−06 |
| 4 | 0.0000E+00 | −1.4090E−03 | −2.8033E−04 | −3.6940E−05 | 4.6898E−06 |
| 5 | 0.0000E+00 | −3.9939E−03 | −1.4629E−04 | −1.7838E−05 | 2.6301E−06 |
| 6 | 0.0000E+00 | −2.8018E−04 | −9.8170E−08 | −5.4890E−06 | 3.8947E−07 |
| 7 | 0.0000E+00 | 9.8294E−03 | −1.4827E−03 | 1.6449E−04 | −9.6737E−06 |
| 8 | 0.0000E+00 | 7.9215E−03 | −4.7219E−04 | 4.8074E−05 | 2.5181E−06 |
| 9 | 0.0000E+00 | −6.0098E−03 | 4.9475E−04 | −5.6628E−05 | 4.1063E−06 |
| 10 | 0.0000E+00 | −6.0192E−03 | 2.4361E−04 | −3.5619E−05 | 1.5327E−06 |
| 11 | 0.0000E+00 | 1.7119E−03 | 1.3443E−04 | −3.2076E−05 | 5.3290E−07 |
| 12 | 0.0000E+00 | 4.0167E−03 | 1.8733E−04 | 5.3277E−06 | 1.3317E−06 |
| 13 | 0.0000E+00 | −8.6012E−04 | 2.3103E−04 | 1.6139E−05 | −1.2058E−06 |
| 14 | 0.0000E+00 | −3.3438E−03 | 2.4644E−04 | −1.505SE−05 | 7.3173E−07 |

TABLE 18

| | Various data | | |
|---|---|---|---|
| object distance | ∞ | 45.139 | 22.397 |
| lateral magnification | — | −0.5 times | −1.0 times |
| F number | 4.100 | 4.608 | 4.987 |
| lens total length | 21.680 | 21.680 | 21.680 |
| d6 | 1.000 | 3.249 | 8.396 |
| d10 | 6.380 | 4.131 | 0.984 |

The focal length is 21.999, and the maximum image height is 4.000.

TABLE 19

| Group | Starting surface | Focal length | Lens configuration length | Lens movement amount | Magnification |
|---|---|---|---|---|---|
| 1 | 1 | 8.437 | 5.301 | 0.000 | — |
| 2 | 7 | −11.495 | 3.350 | 5.396 | 2.269 |
| 3 | 11 | −34.345 | 2.178 | 0.000 | 1.149 |

TABLE 20

| | Individual lens data | |
|---|---|---|
| Lens | Stating surface | Focal length |
| 1 | 1 | 12.544 |
| 2 | 3 | −8.154 |
| 3 | 5 | 5.982 |
| 4 | 7 | −6.143 |
| 5 | 9 | 16.548 |
| 6 | 11 | −39.691 |
| 7 | 13 | −270.708 |

Embodiment 5

Figure 22:
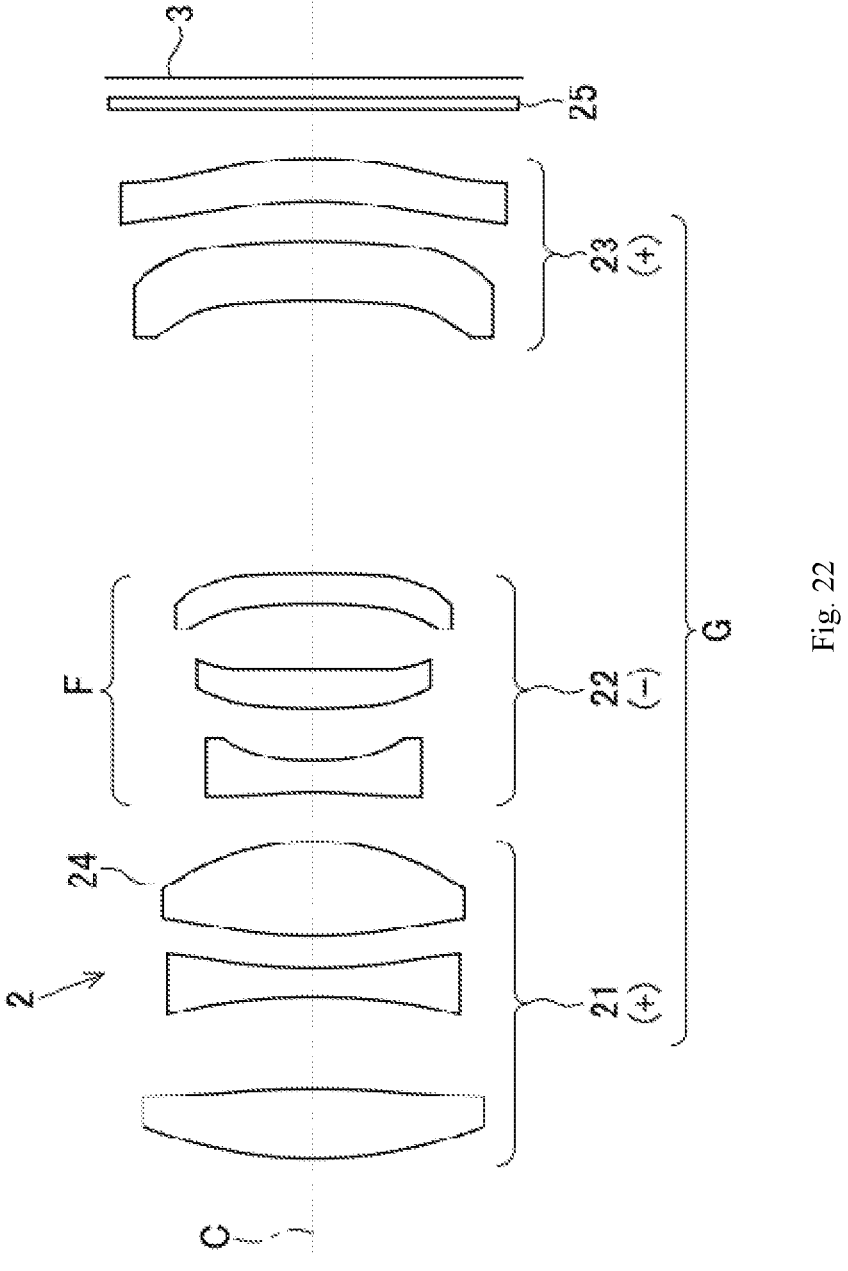
FIG. 22 is a lens configuration diagram of an optical system according to embodiment 5 in an infinity focus state.
Figure 23:
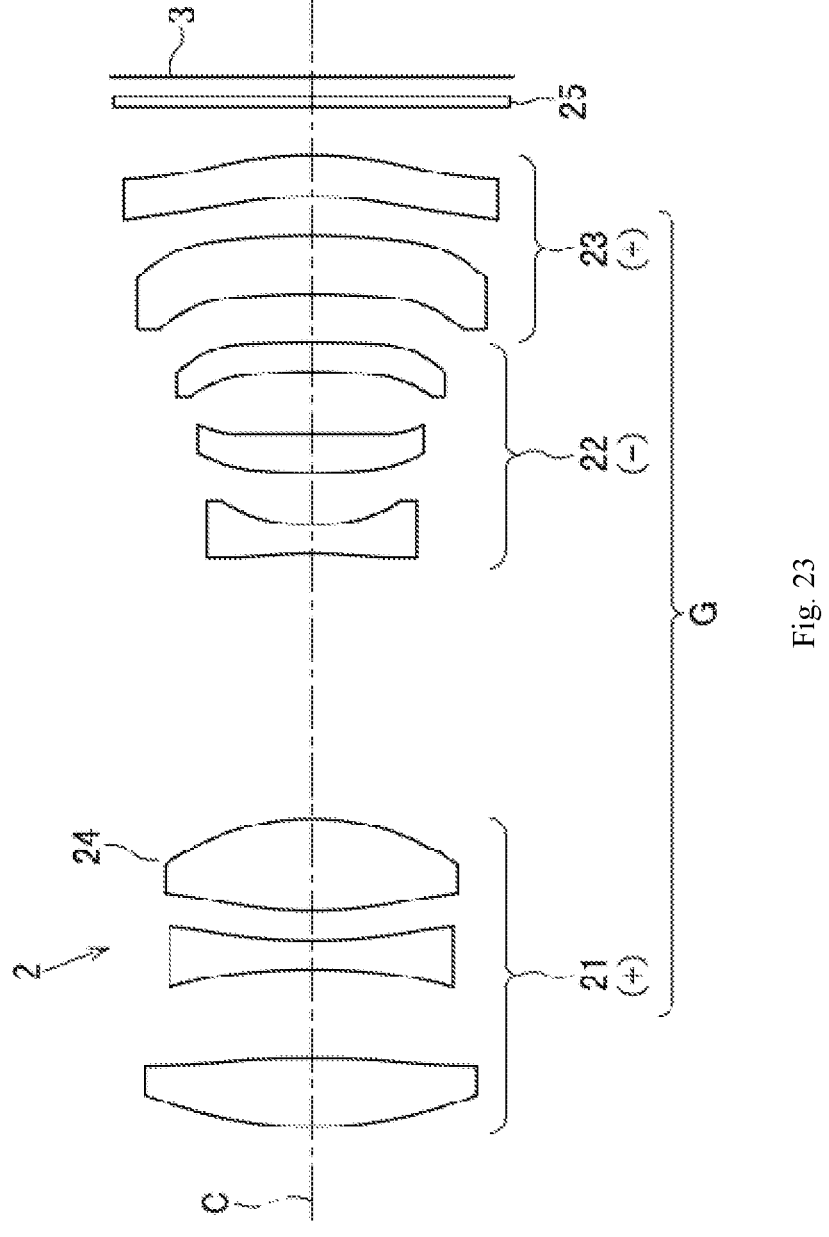
FIG. 23 is a lens configuration diagram of an optical system according to embodiment 5 in a closest focused state.

FIGS. 22 and 23 are lens configuration diagrams of the optical system according to Embodiment 5, with FIG. 22 showing an infinity focus state and FIG. 23 showing a recent focus state. In addition, the reference numerals indicating the configurations of the optical system are the same as those of the corresponding configurations of the optical system 2 of the above embodiment. In addition, in this optical system, similarly, when focusing, the positions of the first lens group 21 and the third lens group 23 on the optical axis C are fixed relative to the photographing element (imaging plane) 3.

Figure 24:
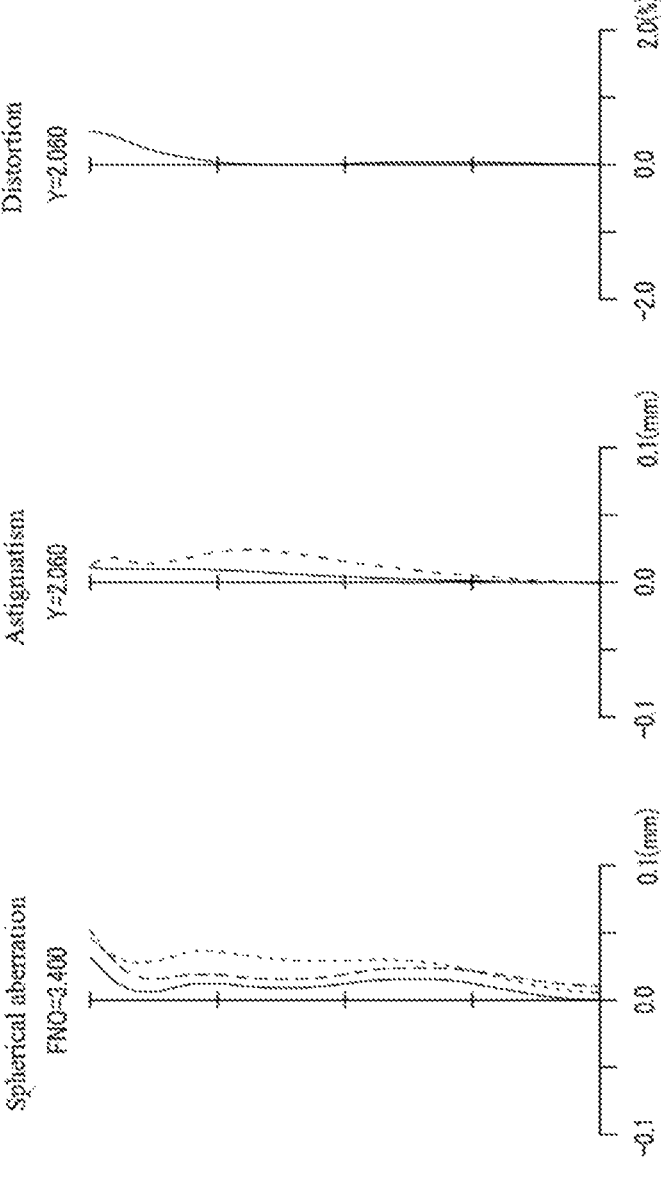
FIG. 24 is a longitudinal aberration diagram of an optical system according to embodiment 5 in an infinity focus state.
Figure 25:
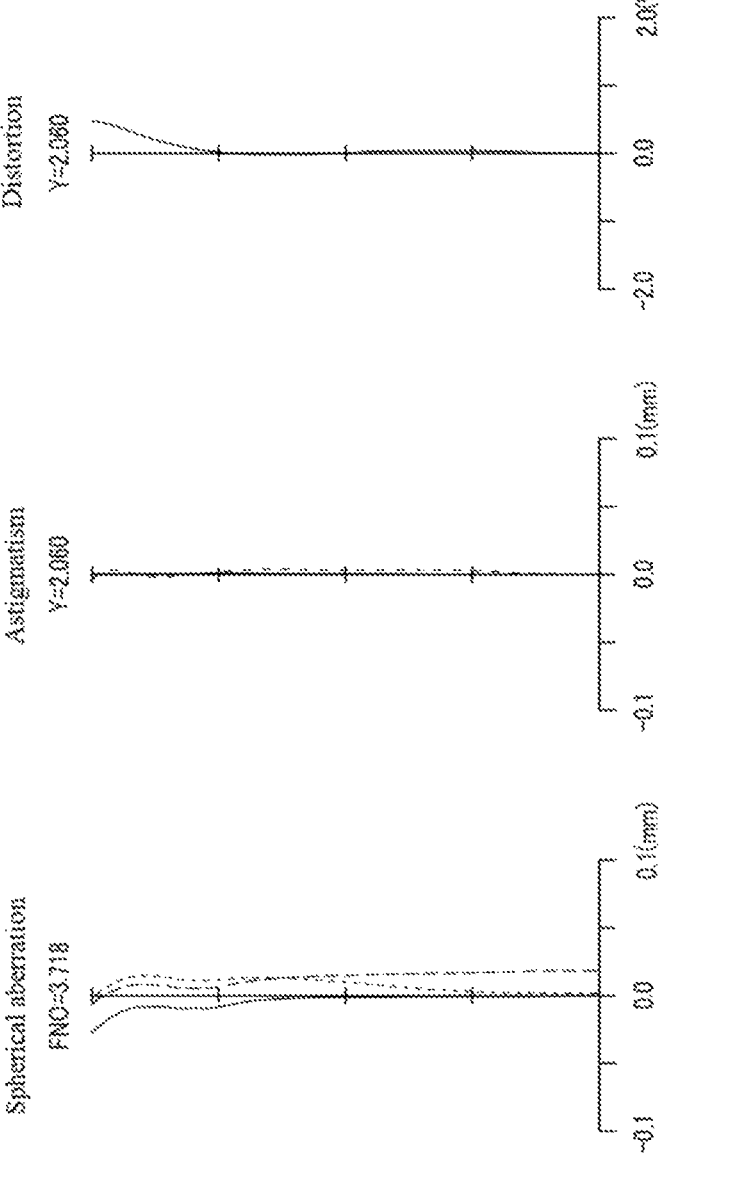
FIG. 25 is a longitudinal aberration diagram of an optical system according to embodiment 5 at a magnification of −0.5.
Figure 26:
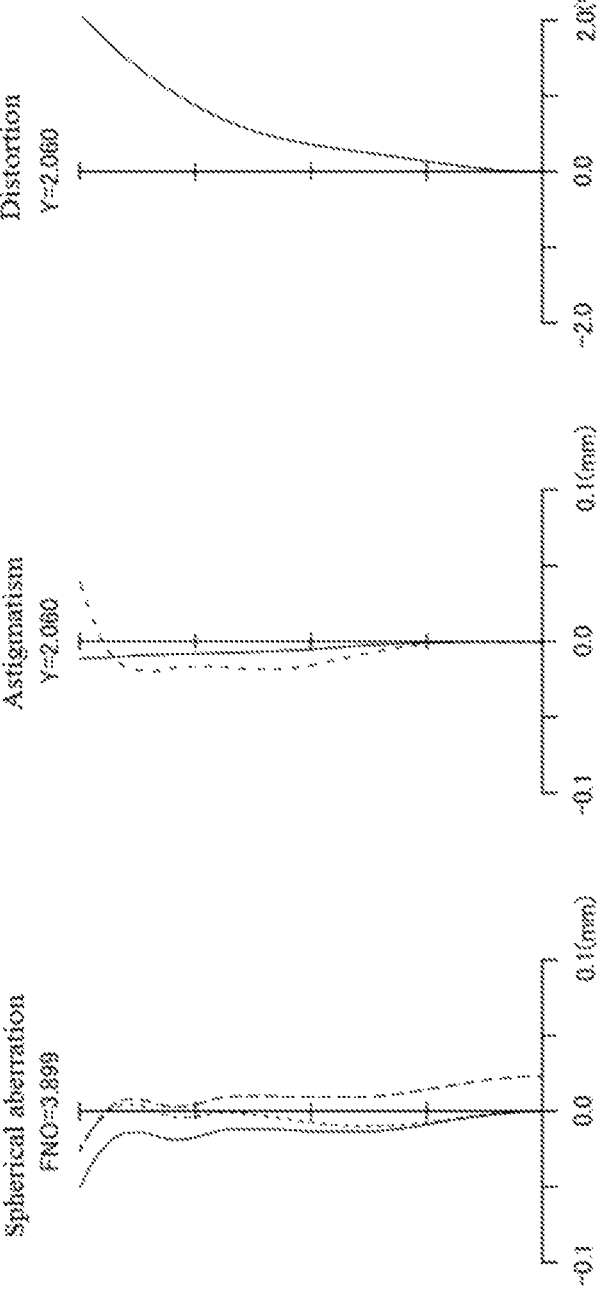
FIG. 26 is a longitudinal aberration diagram of an optical system according to embodiment 5 at a magnification of −1.0.

FIG. 24 is a longitudinal aberration diagram in an infinity focus state, FIG. 25 is a longitudinal aberration diagram at a magnification of −0.5, and FIG. 26 is a longitudinal aberration diagram at a magnification of −1.0. In addition, Table 21 below shows surface data of each lens, Table 22 shows aspheric surface data, Table 23 shows various data, Table 24 shows lens group data, and Table 25 shows individual lens data.

TABLE 21

| Surface number | r | d | nd | vd | |
|---|---|---|---|---|---|
| 1* | 5.000 | 0.704 | 1.5731 | 37.65 | |
| 2* | −10.134 | 0.918 | | | |
| 3* | −8.745 | 0.300 | 1.6714 | 19.27 | |
| 4* | 5.062 | 0.300 | | | |
| 5* | 4.203 | 0.943 | 1.5445 | 55.96 | |
| 6* | −2.710 | d6 | | | (Aperture diaphragm) |
| 7* | 4.355 | 0.300 | 1.5445 | 85.96 | |
| 8* | 2.680 | 0.539 | | | |
| 9* | 7.651 | 0.393 | 1.6714 | 19.27 | |
| 10* | −35.784 | 0.648 | | | |

TABLE 21-continued

| Surface number | r | d | nd | vd |
|---|---|---|---|---|
| 11* | −9.963 | 0.303 | 1.5445 | 55.96 |
| 12* | 68.840 | d12 | | |
| 13* | −15.998 | 0.600 | 1.5445 | 55.96 |
| 14* | −17.581 | 0.400 | | |
| 15* | −3.703 | 0.426 | 1.6397 | 23.49 |
| 16* | −3.566 | 0.500 | | |
| 17 | ∞ | 0.105 | 1.5168 | 64.20 |
| 18 | ∞ | 0.195 | | |

*for aspheric surface

TABLE 22

Aspheric surface data (the aspheric coefficient not shown is 0.00.)

| Surface number | k | A4 | A6 | A8 | A10 |
|---|---|---|---|---|---|
| 1 | 0.0000E+00 | −2.0137E−03 | 6.1164E−04 | 5.5341E−04 | −5.0798E−05 |
| 2 | 0.0000E+00 | 2.8040E−03 | 1.3283E−03 | 5.7280E−04 | −1.3893E−04 |
| 3 | 0.0000E+00 | −4.6433E−03 | −3.4295E−03 | −5.6554E−04 | −3.7552E−04 |
| 4 | 0.0000E+00 | −8.3886E−03 | −4.4996E−03 | −1.2698E−03 | 4.6198E−04 |
| 5 | 0.0000E+00 | −1.3497E−02 | −2.1801E−03 | −9.8512E−04 | 4.2974E−04 |
| 6 | 0.0000E+00 | 4.6798E−04 | −3.8477E−04 | −8.2789E−04 | 2.2079E−04 |
| 7 | 0.0000E+00 | 1.4642E−01 | −1.0687E−01 | 4.7813E−02 | −9.5268E−03 |
| 8 | 0.0000E+00 | 1.5113E−01 | −5.0849E−02 | 8.3324E−03 | 2.6763E−03 |
| 9 | 0.0000E+00 | 7.9018E−03 | 8.6001E−02 | −1.7887E−02 | 2.1887E−03 |
| 10 | 0.0000E+00 | 1.5248E−02 | 4.0273E−02 | 1.8810E−02 | −1.5587E−02 |
| 11 | 0.0000E+00 | −9.2058E−02 | 2.2545E−02 | 1.9782E−02 | −1.5821E−02 |
| 12 | 0.0000E+00 | −1.0625E−01 | 2.6879E−02 | −6.5986E−04 | −4.7834E−03 |
| 13 | 0.0000E+00 | −3.3818E−02 | −1.6708E−03 | 2.0335E−03 | 2.9540E−04 |
| 14 | 0.0000E+00 | −1.9122E−02 | −3.0555E−03 | −1.3109E−03 | 2.4628E−04 |
| 15 | 0.0000E+00 | 4.0458E−02 | −1.0220E−02 | 3.0396E−03 | −4.4084E−04 |
| 18 | 0.0000E+00 | 3.1649E−02 | 9.5572E−03 | 4.1256E−03 | −5.8904E−04 |

TABLE 23

Various data

| | | | |
|---|---|---|---|
| object distance | ∞ | 44.617 | 21.900 |
| lateral magnification | — | −0.5 times | −1.0 times |
| F number | 3.400 | 3.718 | 3.899 |
| lens total length | 10.800 | 10.800 | 10.800 |
| d6 | 0.500 | 1.413 | 2.733 |
| d12 | 2.725 | 1.812 | 0.492 |

The focal length is 11.601, and the maximum image height is 2.060.

TABLE 24

Lens group data

| Group | Starting surface | Focal length | Lens confirmation length | Lens movement amount | Magnification |
|---|---|---|---|---|---|
| 1 | 1 | 4.043 | 3.166 | 0.000 | — |
| 2 | 7 | −3.431 | 2.183 | 2.233 | 2.729 |
| 3 | 13 | 79.998 | 1.426 | 0.000 | 1.051 |

21

TABLE 25

| Individual lens data | | |
|---|---|---|
| Lens | Starting surface | Focal length |
| 1 | 1 | 5.943 |
| 2 | 3 | −4.734 |
| 3 | 5 | 3.179 |
| 4 | 7 | −3.002 |
| 5 | 9 | 9.423 |
| 6 | 11 | −15.963 |
| 7 | 13 | −376.637 |
| 8 | 15 | 68.077 |

In the above embodiments 1 to 5, the values corresponding to the conditions of the above embodiments are shown in the following Table 26. In addition, in Table 26, conditional formula (1) is b3, conditional formula (2) is OAL/f, conditional formula (3) is |B|, and conditional formula (5) is nd2p, conditional formula (6) is A, conditional formula (7) is $(1-b2^2) \times b3^2$, conditional formula (8) is f2/f.

TABLE 26

| Corresponding values of conditional formulas | | | | | |
|---|---|---|---|---|---|
| | Embodiment 1 | Embodiment 2 | Embodiment 3 | Embodiment 4 | Embodiment 5 |
| Conditional formula (1) | 1.145 | 1.065 | 1.085 | 1.149 | 1.051 |
| Conditional formula (2) | 0.986 | 0.931 | 0.931 | 0.985 | 0.931 |
| Conditional formula (3) | 1.000 | 1.000 | 1.000 | 1.000 | 1.000 |
| Conditional formula (4) | 1.671 | 1.671 | 1.671 | 1.656 | 1.671 |
| Conditional formula (5) | 1.864 | 1.864 | 1.864 | 1.869 | 1.864 |
| Conditional formula (7) | −5.813 | −6.610 | −8.916 | −5.477 | −7.122 |
| Conditional formula (8) | −0.482 | −0.323 | −0.349 | −0.523 | −0.296 |
| b3 | 1.145 | 1.065 | 1.085 | 1.149 | 1.051 |
| OAL | 21.680 | 10.800 | 10.800 | 21.680 | 10.800 |
| f | 21.999 | 11.600 | 11.598 | 21.999 | 11.601 |
| \| B \| | 1.000 | 1.000 | 1.000 | 1.000 | 1.000 |
| nd2p | 1.671 | 1.671 | 1.671 | 1.656 | 1.671 |
| vd2p | 19.270 | 19.270 | 19.270 | 21.250 | 19.270 |
| A | 1.864 | 1.884 | 1.864 | 1.869 | 1.864 |
| b2 | 2.331 | 2.613 | 2.622 | 2.269 | 2.729 |
| f2 | −10.613 | −3.745 | −4.044 | −11.495 | −3.431 |

In order to indicate the present disclosure, while referring to the attached drawings, the present disclosure has been properly and fully explained through the embodiments, but those skilled in the art should realize that the above embodiments may be easily changed and/or improved. Therefore, as long as the alteration or improvement carried out by a person skilled in the art does not deviate from the scope of the claims recorded in the claims, the alteration or improvement shall be interpreted as being included in the scope of the rights of the claims.

Description of Reference Numerals

1 . . . photographing device, 2 . . . optical system, 20 . . . prism (reflective optical element), 21 . . . first lens group, 22 . . . second lens group, 221 . . . lens having the strongest positive refractive power in the second lens group 22, 222 . . . lens having the strongest negative refractive power in the second lens group 22, 23 . . . third lens group, 25 . . . filter, 26 . . . lens barrel, 3 . . . photographing element, 4 . . . liquid crystal screen, C . . . optical axis, F . . . focusing lens group, G . . . lens group.

22

What is claimed is:

1. An optical system, comprising:
a first lens group having a positive refractive power, a second lens group having a negative refractive power and a third lens group having a positive or negative refractive power, sequentially arranged from an object side to an image side;
when focusing, the second lens group moves along an optical axis, and positions of the first lens group and the third lens group relative to an imaging plane in a direction of the optical axis are fixed;
where a lateral magnification of the third lens group focusing at infinity is b3, a distance from a face closest to the object side of the entire optical system to the imaging plane is OAL, a focal length of the optical system focusing at infinity is f, and a maximum lateral magnification of the entire optical system is B, it is satisfied that:

$$0.80 \leq b3,$$

$$OAL/f \leq 2.00, \text{ and}$$

$$0.50 \leq |B|; \text{ and}$$

wherein the second lens group has:
at least one lens having a positive refractive power; and
at least one lens having a negative refractive power,
in the second lens group, a lens having the strongest positive refractive power is located closer to the image side than a lens having the strongest negative refractive power.

2. An optical system, comprising:
a first lens group having a positive refractive power, a second lens group having a negative refractive power and a third lens group having a positive or negative refractive power, sequentially arranged from an object side to an image side,
when focusing, the second lens group moves along an optical axis, and positions of the first lens group and the third lens group relative to an imaging plane in a direction of the optical axis are fixed;

the second lens group has at least one lens having a
positive refractive power,
when a refractive index of the lens having a positive
refractive power based on a d-line is nd2p, an Abbe
number of the lens having a positive refractive power
based on the d-line is vd2p, and a variable is A, it is
satisfied that:

$$nd2p = -0.01 \times vd2p + A$$

$$1.55 \le nd2p \le 1.72, \text{ and}$$

$$1.82 \le A \le 1.94.$$

3. The optical system according to claim 1, wherein,
when a lateral magnification of the second lens group
focusing at infinity is b2 and the lateral magnification
of the third lens group focusing at infinity is b3, it is
satisfied that:

$$-10.00 \le \left(1 - b2^2\right) \times b3^2 \le -2.00.$$

4. The optical system according to claim 1, wherein,
when the focal length of the entire optical system focusing
at infinity is f, and a focal length of the second lens
group is f2, it is satisfied that:

$$-0.70 \le f2/f \le -0.10.$$

5. A photographing device, comprising:
an optical system according to claim 1; and
a photographing element arranged at a side of the imaging
plane of the optical system and configured to convert an
optical image formed by the optical system into an
electrical signal.
6. The optical system according to claim 1, wherein,
it is satisfied that:

$$0.90 \le b3 \le 2.00.$$

7. The optical system according to claim 6, wherein it is
satisfied that:

$$1.00 \le b3 \le 1.20.$$

8. The optical system according to claim 1, wherein it is
satisfied that:

$$0.80 \le OAL/f \le 1.50.$$

9. The optical system according to claim 8, wherein it is
satisfied that:

$$0.90 \le OAL/f \le 1.00.$$

10. The optical system according to claim 1, wherein it is
satisfied that:

$$0.75 \le |B|.$$

11. The optical system according to claim 10, wherein it
is satisfied that:

$$1.00 \le |B|.$$

12. The optical system according to claim 2, wherein,
the second lens group has:
at least one lens having a negative refractive power,
in the second lens group, a lens having the strongest
positive refractive power is located closer to the image
side than a lens having the strongest negative refractive
power.
13. The optical system according to claim 2, wherein,
a lateral magnification of the second lens group focusing
at infinity is b2, the lateral magnification of the third
lens group focusing at infinity is b3, and it is satisfied
that:

$$-10.00 \le \left(1 - b2^2\right) \times b3^2 \le -2.00.$$

14. The optical system according to claim 2, wherein,
the focal length of the optical system focusing at infinity
is f, a focal length of the second lens group is f2, and
it is satisfied that:

$$-0.70 \le f2/f \le -0.10.$$

15. The optical system according to claim 2, wherein it is
satisfied that:

$$1.57 \le nd2p \le 1.70.$$

16. The optical system according to claim 15, wherein it
is satisfied that:

$$1.59 \le nd2p \le 1.68.$$

17. The optical system according to claim 2, wherein it is
satisfied that:

$$1.84 \le A \le 1.92.$$

18. The optical system according to claim 17, wherein it
is satisfied that:

$$1.86 \le A \le 1.90.$$

19. A photographing device, comprising:

an optical system according to claim 2; and a photographing element arranged at a side of the imaging plane of the optical system and configured to convert an optical image formed by the optical system into an electrical signal.

\* \* \* \* \*